(12) United States Patent
Otani et al.

(10) Patent No.: US 8,098,995 B2
(45) Date of Patent: Jan. 17, 2012

(54) OPTICAL SIGNAL SYNCHRONIZATION SAMPLING APPARATUS AND METHOD, AND OPTICAL SIGNAL MONITORING APPARATUS AND METHOD USING THE SAME

(75) Inventors: Akihito Otani, Atsugi (JP); Takao Tanimoto, Hadano (JP)

(73) Assignee: Anritsu Corporation, Atsugi-Shi (JP)

( * ) Notice: Subject to any disclaimer, the term of this patent is extended or adjusted under 35 U.S.C. 154(b) by 799 days.

(21) Appl. No.: 12/160,072

(22) PCT Filed: Dec. 11, 2007

(86) PCT No.: PCT/JP2007/073875
§ 371 (c)(1),
(2), (4) Date: Jul. 3, 2008

(87) PCT Pub. No.: WO2008/084620
PCT Pub. Date: Jul. 17, 2008

(65) Prior Publication Data
US 2009/0232513 A1    Sep. 17, 2009

(30) Foreign Application Priority Data
Jan. 9, 2007   (JP) .................................. 2007-001079

(51) Int. Cl.
*H04B 10/00* (2006.01)
(52) U.S. Cl. .............................. 398/154; 398/25; 398/33
(58) Field of Classification Search .............. 398/25–33, 398/154
See application file for complete search history.

(56) References Cited

U.S. PATENT DOCUMENTS
6,396,601 B1   5/2002   Takara et al.
(Continued)

FOREIGN PATENT DOCUMENTS
JP   5-196641 A   8/1993
(Continued)

OTHER PUBLICATIONS
Japanese Office Action dated Jan. 25, 2011 (and English translation thereof) in counterpart Japanese Application No. 2008-529396.
(Continued)

*Primary Examiner* — Dzung Tran
(74) *Attorney, Agent, or Firm* — Holtz, Holtz, Goodman & Chick, PC

(57) ABSTRACT

An electroabsorption optical modulator used as a sampling element has two optical terminals and a power supply terminal, the two optical terminals are used to input and output light, and the power supply terminal imparts an electric field to an optical path connecting the two optical terminals. The electroabsorption optical modulator has a characteristic in which an absorption index is changed with respect to the light beam propagating through the optical path according to a level of the electric field. A monitoring (synchronization sampling) object optical signal is input into one of the two optical terminals of the electroabsorption optical modulator. A predetermined direct-current voltage exhibiting a high absorption index for the monitoring (synchronization sampling) object optical signal is imparted to the power supply terminal of the electroabsorption optical modulator. A sampling optical pulse is input into another of the two optical terminals of the electroabsorption optical modulator through a photocoupler. The absorption index for the monitoring (synchronization sampling) object optical signal is lowered by a mutual absorption saturation characteristic of the electroabsorption optical modulator, and synchronization sampling of the monitoring (synchronization sampling) object optical signal is performed to supply an optical signal from the other of the two optical terminals of the electroabsorption optical modulator through the photocoupler. The mutual absorption saturation characteristic is generated when the sampling optical pulse is input into the other of the two optical terminals.

25 Claims, 7 Drawing Sheets

U.S. PATENT DOCUMENTS

| | | |
|---|---|---|
| 6,483,287 B2 | 11/2002 | Otsubo et al. |
| 7,174,098 B2 | 2/2007 | Yokoyama |
| 7,532,818 B2 * | 5/2009 | Hsu et al. .................... 398/27 |
| 7,835,643 B2 * | 11/2010 | Futami et al. ................ 398/25 |
| 2002/0126352 A1 | 9/2002 | Shake et al. |
| 2002/0126362 A1 * | 9/2002 | Shimomura ............. 359/196 |
| 2003/0011837 A1 | 1/2003 | Shake et al. |
| 2005/0047788 A1 | 3/2005 | Miyazaki |
| 2010/0150548 A1 * | 6/2010 | Otani et al. ................. 398/25 |

FOREIGN PATENT DOCUMENTS

| | | |
|---|---|---|
| JP | 11-223575 A | 8/1999 |
| JP | 2002-55124 A | 2/2002 |
| JP | 2003-90766 A | 3/2003 |
| JP | 2004-222252 A | 8/2004 |
| JP | 2004-286511 A | 10/2004 |
| JP | 2005-70698 A | 3/2005 |
| JP | 2005-337844 A | 12/2005 |
| JP | 3796357 B2 | 4/2006 |

OTHER PUBLICATIONS

U.S. Appl. No. 12/085,876; First Named Inventor: Akihito Otani; Title: "Optical Signal Quality Monitoring Apparatus and Method"; filed May 30, 2008.

English language International Search Report dated Mar. 18, 2008, issued in a counterpart International Application.

International Preliminary Report on Patentability and Written Opinion of the International Searching Authority dated Jul. 23, 2009 (8 pages), issued in counterpart International application No. PCT/JP2007/073875.

* cited by examiner

OPTICAL SIGNAL SYNCHRONIZATION SAMPLING APPARATUS AND METHOD, AND OPTICAL SIGNAL MONITORING APPARATUS AND METHOD USING THE SAME

This application is a U.S. National Phase Application under 35 USC 371 of International Application PCT/JP2007/073875 filed Dec. 11, 2007.

TECHNICAL FIELD

The present invention relates to optical signal synchronization sampling apparatus and method and optical signal monitoring apparatus and method using the same, and particularly to optical signal synchronization sampling apparatus and method in which a technique of enabling information on a waveform of an optical signal modulated by a high-speed data signal to be accurately sampled with sufficient resolution is adopted, and optical signal monitoring apparatus and method in which the optical signal can correctly be monitored using the optical signal synchronization sampling apparatus and method.

BACKGROUND ART

In forming a network using the optical signal modulated by the data signal, it is necessary to monitor the quality of the optical signal propagating through the network with the optical signal monitoring apparatus.

Generally, the optical signal monitoring apparatus obtains information on a waveform of a signal on a transmission path, and computes a value indicating the signal quality from the waveform information and supplies the computation result. Therefore, in the optical signal monitoring apparatus, it is extremely difficult to obtain the waveform information by a photodetector directly receiving the optical signal which is modulated by a data signal having a bit rate very high as tens of Gb/s.

In a conventional optical signal monitoring apparatus, an equivalent time sampling method is adopted to obtain the information on the waveform of the high-speed optical signal.

In the equivalent time sampling method, sampling is performed to an optical signal P in which the same waveform is repeated at a period Ta as shown in (a) of FIG. 9 using a sampling pulse S having a period of Ts=N·Ta+ΔT which is slightly longer than N multiplications (N is an integer) of the period Ta by a time ΔT as shown in (b) of FIG. 9, thereby obtaining instantaneous amplitude values (instantaneous intensity) at positions shifted from each other by ΔT in the repetitive waveform of the optical signal P as shown (c) of in FIG. 9.

A waveform P' drawn by an envelope curve connecting the obtained instantaneous amplitude values is one in which the waveform of the optical signal P is enlarged by a factor of Ts/ΔT on a temporal axis. The waveform P' retains the waveform characteristics of the original optical signal P.

Accordingly, a probability distribution of an amplitude indicating one of binary levels and an amplitude indicating another of the binary levels is obtained for the waveform information obtained by the equivalent time sampling, and a Q value indicating the signal quality can be obtained by computation of a standard deviation of the probability distribution.

For example, Patent Document 1 discloses a technique of performing the equivalent time sampling to the optical signal to compute the Q value indicating the signal quality from the obtained waveform information.

Patent Document 1: Japanese Patent No. 3796357

In the technique disclosed in Patent Document 1, usually a non-linear optical material is used as an element for performing the equivalent time sampling to the optical signal.

Because the non-linear optical material usually has low sampling efficiency (sampling efficiency measured by a waveform conversion phenomenon, that is, waveform conversion efficiency is not more than −20 dB), high S/N can be obtained for the information on the waveform of the strong optical signal while poor S/N is obtained for the information on the waveform of the weak optical signal.

Therefore, it is thought that an electroabsorption optical modulator having a transmission loss which is significantly lower than that of the non-linear optical material, in other words, the substantially high sampling efficiency is used as the element for performing the equivalent time sampling of the optical signal.

The electroabsorption optical modulator has a characteristic in which an absorption index is changed with respect to light passed through an optical path according to a level of an electric field imparted to the optical path connecting two optical terminals. In the electroabsorption optical modulator, the optical signal is fed into one of the optical terminals, an electric sampling pulse signal is imparted to a power supply terminal, and the absorption index is lowered with respect to the optical signal to supply the sampling pulse signal from another of the optical terminals only when the sampling pulse signal is fed, thereby performing the sampling to the optical signal.

For example, Patent Document 2 discloses a technique of imparting the electric sampling pulse signal to the power supply terminal of the electroabsorption optical modulator to perform the sampling to the optical signal.

Patent Document 2: Jpn. Pat. Appln. KOKAI Publication No. 2004-222252

However, in the technique disclosed in Patent Document 2, high-frequency impedance matching is required in the electric sampling pulse signal, and it is extremely difficult that a pulse width of the electric sampling pulse signal is stably narrowed without ringing. Therefore, there is generated a new problem in that the information on the waveform of the optical signal modulated at tens of Gb/s cannot accurately be obtained with sufficient resolution.

Furthermore, in the optical signal quality monitoring apparatus in which the equivalent time sampling method disclosed in Patent Document 1 is adopted, the obtained waveforms of the predetermined number of bits are superimposed to produce an eye pattern. In the case where the quality computation processing is performed to the eye pattern, a temporal axes of the superimposed waveforms are gradually shifted unless the sampling period Ts is strictly matched with N·Tc+ΔT, which results in another problem in that the quality computation cannot correctly be performed.

DISCLOSURE OF INVENTION

In order to solve the problems of the conventional technique, an object of the invention is to provide optical signal synchronization sampling apparatus and method, in which the information on the waveform of the high-speed optical signal can accurately be sampled with the high sampling efficiency and sufficient resolution, and optical signal monitoring apparatus and method, in which the eye pattern of the optical signal can stably be obtained while the optical signal can correctly be monitored using the optical signal synchronization sampling apparatus and method.

In order to achieve the above-described object, according to a first aspect of the present invention, there is provided an optical signal synchronization sampling apparatus (100) comprising:

a sampling optical pulse generation unit (21) which emits a sampling optical pulse (Ps) having a period Ts different from a predetermined offset time ΔT to integral N multiplication of a clock period Tc of a data signal, the data signal modulating a sampling object optical signal (Px); and an optical sampling unit (22) which supplies an optical pulse signal (Py) obtained by performing synchronization sampling of the sampling object optical signal (Px) using the sampling optical pulse (Ps) emitted by the sampling optical pulse generation unit (21), wherein the optical sampling unit (22) includes:

an electroabsorption optical modulator (23) which has two optical terminals (23a, 23b) and a power supply terminal (23c), the two optical terminals (23a, 23b) being used to input and output light, the power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the sampling object optical signal (Px) at one of the two optical terminals (23a, 23b);

a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the sampling object optical signal (Px) at the predetermined direct-current voltage (Vdc); and a photocoupler (25) which receives the sampling optical pulse (Ps) to input the sampling optical pulse (Ps) into another of the two optical terminals (23a, 23b) of the electroabsorption optical modulator (23), the sampling optical pulse (Ps) being emitted by the sampling optical pulse generation unit (21), the photocoupler (25) receiving the sampling object optical signal (Px) to output the sampling object optical signal (Px) as the optical pulse signal (Py), the sampling object optical signal (Px) being emitted by the other of the two optical terminals (23a, 23b) of the electroabsorption optical modulator (23), and wherein when the sampling optical pulse (Ps) is input, the absorption index is lowered by a mutual absorption saturation characteristic of the electroabsorption optical modulator (23), and the sampling object optical signal (Px) is passed onto a side of the other of the two optical terminals (23a, 23b) of the electroabsorption optical modulator (23) to perform the synchronization sampling.

In order to achieve the above-described object, according to a second aspect of the present invention, there is provided the optical signal synchronization sampling apparatus according to the first aspect, wherein, in order to prevent leakage of the sampling optical pulse (Ps) to a transmission path of the sampling object optical signal (Px), the sampling optical pulse (Ps) being input into the other of the two optical terminals (23a, 23b) of the electroabsorption optical modulator (23), the optical sampling unit (22) further includes:

a second photocoupler (26) which is inserted into the one of the two optical terminals (23a, 23b) of the electroabsorption optical modulator (23); and an optical terminator (27) which terminates the sampling optical pulse (Ps) through the second photocoupler (26).

In order to achieve the above-described object, according to a third aspect of the present invention, there is provided the optical signal synchronization sampling apparatus according to the first aspect, wherein the sampling optical pulse generation unit (21) includes:

a reference signal generator (21a) having a synthesizer configuration in which a stable signal (Ra) is produced, the stable signal (Ra) having a period Ts corresponding to a period of the sampling optical pulse;

a multiplier (21b) which supplies the stable signal (Ra) as a signal (Rb) multiplied by a factor of M (M is more than one), the stable signal (Ra) being produced by the reference signal generator (21a) and having the period Ts;

a light source (21d) which emits continuous light (Pcw);

an optical modulator (21c) which modulates the continuous light (Pcw) emitted from the light source (21d) by the signal (Rb) multiplied by the factor of M, thereby supplying an optical pulse (Pa) having a period Ts/M, the signal (Rb) being supplied from the multiplier (21b)

an optical gating circuit (21e) which thins out the optical pulse (Pa) emitted from the optical modulator (21c) into 1/M, and converts the optical pulse (Pa) into an optical pulse (Pb) having the period Ts; and a dispersion-decreasing fiber (21f) which narrows a pulse width of the optical pulse (Pb) having the period Ts and converted by the optical gating circuit (21e), and supplies the optical pulse (Pb) in a form of the sampling optical pulse (Ps).

In order to achieve the above-described object, according to a fourth aspect of the present invention, there is provided the optical signal synchronization sampling apparatus according to the first aspect, further comprising a parameter setting unit (28) which receives information on a clock period Tc of the data signal modulating the sampling object optical signal (Px) or information on a bit rate of the data signal and information on the predetermined offset time ΔT to obtain a sampling period Ts of the sampling optical pulse (Ps) from computation of $$Ts = N \cdot Tc + \Delta T$$

(where a value of N is determined by the clock period Tc of the data signal and a frequency variable range of a signal which can be supplied from the sampling optical pulse generation unit (21)), the parameter setting unit (28) setting the sampling period Ts of the sampling optical pulse (Ps) in the sampling optical pulse generation unit (21).

In order to achieve the above-described object, according to a fifth aspect of the present invention, there is provided an optical signal monitoring apparatus (20) comprising:

an optical signal synchronization sampling apparatus (100) including a sampling optical pulse generation unit (21) which emits a sampling optical pulse (Ps) having a period Ts different from a predetermined offset time ΔT to integral N multiplication of a clock period Tc of a data signal, the data signal modulating a monitoring object optical signal (Px) and an optical sampling unit (22) which supplies an optical pulse signal (Py) obtained by performing synchronization sampling of the monitoring object optical signal (Px) using the sampling optical pulse (Ps) emitted by the sampling optical pulse generation unit (21);

a photoelectric converter (30) which receives light of the optical pulse signal (Py) supplied from the optical sampling unit (22) of the optical signal synchronization sampling apparatus (100), and converts the optical pulse signal (Py) into an electric signal (Ey) to output the electric signal (Ey);

fundamental wave component signal output means (35) for supplying a fundamental wave component signal (U) having a frequency identical to that of a fundamental wave component of an envelope curve of the electric signal (Ey) supplied from the photoelectric converter (30);

a comparator (36) which compares the fundamental wave component signal (U) supplied from the fundamental wave component signal output means (35) and a predetermined threshold value (Vr); and a data obtaining control unit (38) which starts to obtain information on a waveform of the electric signal (Ey) supplied from the photoelectric converter (30) at a time the fundamental wave component signal (U) exceeds the threshold value (Vr) in the comparison performed by the comparator (36), wherein the optical sampling unit (22) of the optical signal synchronization sampling apparatus (100) includes:

an electroabsorption optical modulator (23) which has two optical terminals (23a, 23b) and a power supply terminal (23c), the two optical terminals (23a, 23b) being used to input and output light, the power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the monitoring object optical signal (Px) at one of the two optical terminals (23a, 23b);

a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the monitoring object optical signal (Px) at the predetermined direct-current voltage (Vdc); and a photocoupler (25) which receives the sampling optical pulse (Ps) to input the sampling optical pulse (Ps) into another of the two optical terminals (23a, 23b) of the electroabsorption optical modulator (23), the sampling optical pulse (Ps) being emitted from the sampling optical pulse generation unit (21) of the optical signal synchronization sampling apparatus (100), the photocoupler (25) receiving the monitoring object optical signal (Px) to input the monitoring object optical signal (Px) as the optical pulse signal (Py) into the photoelectric converter (30), the monitoring object optical signal (Px) being emitted from the other of the two optical terminals (23a, 23b) of the electroabsorption optical modulator (23), and wherein when the sampling optical pulse (Ps) is supplied, the absorption index is lowered by a mutual absorption saturation characteristic of the electroabsorption optical modulator (23), and the monitoring object optical signal (Px) is passed onto a side of the other of the two optical terminals (23a, 23b) of the electroabsorption optical modulator (23) to perform the synchronization sampling.

In order to achieve the above-described object, according to a sixth aspect of the present invention, there is provided the optical signal monitoring apparatus according to the fifth aspect, wherein, in order to prevent leakage of the sampling optical pulse (Ps) to a transmission path of the monitoring object optical signal (Px), the sampling optical pulse (Ps) being input into the other of the two optical terminals (23a, 23b) of the electroabsorption optical modulator (23), the optical sampling unit (22) further includes:

a second photocoupler (26) which is inserted into the one of the two optical terminals (23a, 23b) of the electroabsorption optical modulator (23); and an optical terminator (27) which terminates the sampling optical pulse (Ps) through the second photocoupler (26).

In order to achieve the above-described object, according to a seventh aspect of the present invention, there is provided the optical signal monitoring apparatus according to the fifth aspect, wherein the sampling optical pulse generation unit (21) includes:

a reference signal generator (21a) having a synthesizer configuration in which a stable signal (Ra) is produced, the stable signal (Ra) having a period Ts corresponding to a period of the sampling optical pulse (Ps);

a multiplier (21b) which supplies the stable signal (Ra) as a signal (Rb) multiplied by a factor of M (M is more than one), the stable signal (Ra) being produced by the reference signal generator (21a) and having the period Ts;

a light source (21d) which emits continuous light (Pcw);

an optical modulator (21c) which modulates the continuous light (Pcw) emitted from the light source (21d) by the signal (Rb) multiplied by the factor of M, thereby supplying an optical pulse (Pa) having a period Ts/M, the signal (Rb) being supplied from the multiplier (21b);

an optical gating circuit (21e) which thins out the optical pulse (Pa) emitted from the optical modulator (21c) into 1/M, and converts the optical pulse (Pa) into an optical pulse (Pb) having the period Ts; and a dispersion-decreasing fiber (21f) which narrows a pulse width of the optical pulse (Pb) having the period Ts and converted by the optical gating circuit (21e), and supplies the optical pulse (Pb) as the sampling optical pulse (Ps).

In order to achieve the above-described object, according to an eighth aspect of the present invention, there is provided the optical signal monitoring apparatus according to the fifth aspect, further comprising a parameter setting unit (28) which receives information on a clock period Tc of the data signal modulating the monitoring object optical signal (Px) or information on a bit rate of the data signal and information on the predetermined offset time $\Delta T$ to obtain a sampling period Ts of the sampling optical pulse (Ps) from computation of $$Ts = N \cdot Tc + \Delta T$$

(where a value of N is determined by the clock period Tc of the data signal and a frequency variable range of a signal which can be supplied from the sampling optical pulse generation unit (21)), the parameter setting unit (28) setting the sampling period Ts of the sampling optical pulse (Ps) in the sampling optical pulse generation unit (21).

In order to achieve the above-described object, according to a ninth aspect of the present invention, there is provided the optical signal monitoring apparatus according to the fifth aspect, further comprising an analog/digital (A/D) converter (31) which is inserted between the photoelectric converter (30) and the data obtaining control unit (38), converts the electric signal (Ey) from the photoelectric converter (30) into a digital value (Dy) by sampling the electric signal (Ey) with a sampling clock (Es) synchronized with the sampling optical pulse (Ps), and supplies the digital value (Dy) as a data signal (Dy) to the data obtaining control unit (38).

In order to achieve the above-described object, according to a tenth aspect of the present invention, there is provided the optical signal monitoring apparatus according to the ninth aspect, wherein the sampling clock (Es) is supplied from the sampling optical pulse generation unit (21) while synchronized with the sampling optical pulse (Ps).

In order to achieve the above-described object, according to an eleventh aspect of the present invention, there is provided the optical signal monitoring apparatus according to the fifth aspect, wherein, in a filter system, the fundamental wave component signal output unit (35) includes a narrowband bandpass filter (35f) which has a center frequency equal to a clock frequency (Fc) of the data signal modulating the monitoring object optical signal (Px) or a center frequency double the clock frequency (Fc), and extracts a sinusoidal fundamental wave component signal (U) from the electric signal (Ey) supplied from the photoelectric converter (30).

In order to achieve the above-described object, according to a twelfth aspect of the present invention, there is provided the optical signal monitoring apparatus according to the fifth aspect, wherein, in a PLL (Phase-Locked Loop) system, the fundamental wave component signal output unit (35) includes:

a narrowband bandpass filter (35a) which has a center frequency equal to a clock frequency Fc of the data signal modulating the monitoring object optical signal (Px) or a center frequency double the clock frequency (FE), and extracts a sinusoidal fundamental wave component signal (U) from the electric signal (Ey) supplied from the photoelectric converter (30);

a voltage control oscillator (35b) which supplies an oscillation output signal having a predetermined oscillation frequency; and a phase comparator (35c) which supplies a control signal (Vc) according to a phase difference between an output signal of the bandpass filter (35a) and an output signal of the voltage control oscillator (35b), and the oscillation frequency of the voltage control oscillator (35b) is controlled by the control signal (Vc) supplied from the phase comparator (35c) and a phase of the oscillation output signal is synchronized with a phase of the output signal of the bandpass filter (35a), whereby the synchronized sinusoidal oscillation output signal is supplied as the fundamental wave component signal (U).

In order to achieve the above-described object, according to a thirteenth aspect of the present invention, there is provided the optical signal monitoring apparatus according to the fifth aspect, wherein the fundamental wave component signal output unit (35) includes:

a frequency analysis computation unit (35g) which obtains a frequency of a fundamental wave component by analyzing a frequency of the electric signal (Ey) supplied from the photoelectric converter (30); and a signal generator (35h) which produces and supplies a fundamental wave component signal (U) having a frequency identical to the fundamental wave component frequency obtained by the frequency analysis computation unit (35g).

In order to achieve the above-described object, according to a fourteenth aspect of the present invention, there is provided the optical signal monitoring apparatus according to the ninth aspect, further comprising a waveform memory (39) having a plurality (H) of different areas, the data obtaining control unit (38) writing the data signal (Dy) supplied from the A/D converter (31) in the areas of the waveform memory (39) based on the output signal supplied from the comparator (36).

In order to achieve the above-described object, according to a fifteenth aspect of the present invention, there is provided the optical signal monitoring apparatus according to the fourteenth aspect, wherein the data obtaining control unit (38) repeats an operation predetermined (H) times, and writes a predetermined number (W) of data signals (Dy) in the plurality (H) of different areas of the waveform memory (39) in an address order, the data obtaining control unit (38) starting to write the data signal (Dy) in the waveform memory (39) at a time the fundamental wave component signal (U) exceeds the threshold value (Vr) in the comparator (36) and the data obtaining control unit (38) standing by until the fundamental wave component signal (U) exceeds the threshold value (Vr) again after the predetermined number (W) of data signals are written in the operation.

In order to achieve the above-described object, according to a sixteenth aspect of the present invention, there is provided the optical signal monitoring apparatus according to the fifteenth aspect, further comprising a computation unit (40) which computes a value indicating quality of the monitoring object optical signal (Px) based on the data signal (Dy) written in the waveform memory (39).

In order to achieve the above-described object, according to a seventeenth aspect of the present invention, there is provided the optical signal monitoring apparatus according to the sixteenth aspect, wherein the computation unit (40) compares the data signals (Dy) written in the waveform memory (39) with a predetermined threshold to classify the data signals into a sample value belonging to data "1" and a sample value belonging to data "0", obtains an average value and a standard deviation of a group of sample values for each of the data "1" and the data "0", and obtains a ratio $\mu/\gamma$ of a difference $\mu$ between the average values of the data "1" and the data "0" and a sum $\gamma$ of the standard deviations as a quality value (Q).

In order to achieve the above-described object, according to an eighteenth aspect of the present invention, there is provided the optical signal monitoring apparatus according to the sixteenth aspect, wherein the computation unit (40) superimposes pieces of predetermined-bit waveform data (Dy) in the address order to obtain an eye pattern, the predetermined number (W) of data signals (Dy) being stored in the address order in each time for said plurality (H) of different areas of the waveform memory (39) in the predetermined-bit waveform data (Dy).

In order to achieve the above-described object, according to a nineteenth aspect of the present invention, there is provided an optical signal synchronization sampling method comprising:

a sampling optical pulse generation step of emitting a sampling optical pulse (Ps) having a period Ts different from integral a predetermined offset time $\Delta T$ to N multiplication of a clock period Tc of a data signal, the data signal modulating a sampling object optical signal (Px); and an optical synchronization sampling step of supplying an optical pulse signal (Py) obtained by performing synchronization sampling of the sampling object optical signal (Px) using the sampling optical pulse (Ps) emitted by the sampling optical pulse generation step, wherein the optical synchronization sampling step includes:

a step of preparing an electroabsorption optical modulator (23) which has two optical terminals (23a, 23b) and a power supply terminal (23c), the two optical terminals (23a, 23b) being used to input and output light, the power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the sampling object optical signal (Px) at one of the two optical terminals (23a, 23b);

a step of preparing a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the sampling object optical signal (Px) at the predetermined direct-current voltage (Vdc); and a step of preparing a photocoupler (25) which receives the sampling optical pulse (Ps) to input the sampling optical pulse (Ps) into another of the two optical terminals (23a, 23b) of the electroabsorption optical modulator (23), the sampling optical pulse (Ps) being emitted by the sampling optical pulse generation unit (21), the photocoupler (25) receiving the sampling object optical signal (Px) to output the sampling object optical signal (Px) as the optical pulse signal (Py), the sampling object optical signal (Px) being emitted by the other of the two optical terminals (23a, 23b) of the electroabsorption optical modulator (23), and wherein when the sampling optical pulse (Ps) is input, the absorption index is lowered by a mutual absorption saturation characteristic of the electroabsorption optical modulator (23), and the sampling object optical signal (Px) is passed onto a side of the other of the two optical terminals (23a, 23b) of the electroabsorption optical modulator (23) to perform the synchronization sampling.

In order to achieve the above-described object, according to a twentieth aspect of the present invention, there is provided an optical signal monitoring method comprising:

a sampling optical pulse generation step of emitting a sampling optical pulse (Ps) having a period (Ts) different from a predetermined offset time ΔT to integral N multiplication of a clock period Tc of a data signal, the data signal modulating a monitoring object optical signal (Px);

an optical synchronization sampling step of supplying an optical pulse signal (Py) obtained by performing synchronization sampling of the monitoring object optical signal (Px) using the sampling optical pulse (Ps) emitted by the sampling optical pulse generation step;

a photoelectric conversion step of receiving light of the optical pulse signal (Py) supplied from the optical synchronization sampling step, and converting the optical pulse signal (Py) into an electric signal (Ey) to output the electric signal (Ey);

a fundamental wave component signal output step of supplying a fundamental wave component signal (U) having a frequency identical to that of a fundamental wave component of an envelope curve of the electric signal (Ey) supplied from the photoelectric conversion step;

a comparison step of comparing the fundamental wave component signal (U) supplied from the fundamental wave component signal output step with a predetermined threshold value (Vr); and a data obtaining control step of starting to obtain information on a waveform of the electric signal (Ey) supplied from the photoelectric conversion step at a time the fundamental wave component signal (U) exceeds the threshold value (Vr) in the comparison step, wherein the optical synchronization sampling step includes:

a step of preparing an electroabsorption optical modulator (23) which has two optical terminals (23a, 23b) and a power supply terminal (23c), the two optical terminals (23a, 23b) being used to input and output light, the power supply terminal (23c) imparting an electric field to an optical path connecting the two optical terminals (23a, 23b), the electroabsorption optical modulator (23) having a characteristic in which an absorption index is changed with respect to the light propagating through the optical path according to a level of the electric field, the electroabsorption optical modulator (23) receiving the monitoring object optical signal (Px) at one of the two optical terminals (23a, 23b);

a step of preparing a direct-current power supply (24) which applies a predetermined direct-current voltage (Vdc) to the power supply terminal (23c) of the electroabsorption optical modulator (23), the electroabsorption optical modulator (23) exhibiting a high absorption index with respect to the monitoring object optical signal (Px) at the predetermined direct-current voltage (Vdc); and a step of preparing a photocoupler (25) which receives the sampling optical pulse (Ps) to input the sampling optical pulse (Ps) into another of the two optical terminals (23a, 23b) of the electroabsorption optical modulator (23), the sampling optical pulse (Ps) being emitted from the sampling optical pulse generation step, the photocoupler (25) receiving the monitoring object optical signal (Px) to input the monitoring object optical signal (Px) as the optical pulse signal (Py) into the photoelectric conversion step, the monitoring object optical signal (Px) being emitted from the other of the two optical terminals (23a, 23b) of the electroabsorption optical modulator (23), and wherein when the sampling optical pulse (Ps) is supplied, the absorption index is lowered by a mutual absorption saturation characteristic of the electroabsorption optical modulator (23), and the monitoring object optical signal (Px) is passed onto a side of the other of the two optical terminals (23a, 23b) of the electroabsorption optical modulator (23) to perform the synchronization sampling.

In order to achieve the above-described object, according to a twenty-first aspect of the present invention, there is provided the optical signal monitoring method according to the twentieth aspect, further comprising:

an analog/digital (A/D) conversion step of converting the electric signal (Ey) supplied from the photoelectric conversion step into a digital value by sampling the electric signal (Ey) using a sampling clock (Es) synchronized with the sampling optical pulse (Ps), and supplying the digital value as a data signal (Dy); and a step of preparing a waveform memory (39) having a plurality (H) of different areas, the data obtaining control step writing the data signal (Dy) in the areas of the waveform memory (39) based on the output signal supplied from the comparison step, the data signal (Dy) being supplied from the A/D conversion step.

In order to achieve the above-described object, according to a twenty-second aspect of the present invention, there is provided the optical signal monitoring method according to the twenty-first aspect, wherein, in the data obtaining control step, an operation is repeated predetermined (H) times, and a predetermined number (W) of data signals are written in the plurality (H) of different areas of the waveform memory (39) in an address order, writing of the data signal (Dy) in the waveform memory (39) being started at a time the fundamental wave component signal (U) exceeds the threshold value (Vr) in the comparison step and stand-by being performed until the fundamental wave component signal (U) exceeds the threshold value (Vr) again after the predetermined (W) number of data signals are written in the operation.

In order to achieve the above-described object, according to a twenty-third aspect of the present invention, there is provided the optical signal monitoring method according to the twenty-second aspect, further comprising a computation step of computing a value indicating quality of the monitoring object optical signal (Px) based on the data signal (Dy) written in the waveform memory (39).

In order to achieve the above-described object, according to a twenty-fourth aspect of the present invention, there is provided the optical signal monitoring method according to the twenty-third aspect, wherein, in the computation step, the data signals (Dy) written in the waveform memory (39) are compared with a predetermined threshold value (Vr) to classify the data signals into a sample value belonging to data "1" and a sample value belonging to data "0", an average value and a standard deviation of a group of sample values are obtained for each of the data "1" and the data "0", and a ratio $\mu/\gamma$ of a difference $\mu$ between the average values of the data "1" and the data "0" and a sum $\gamma$ of the standard deviations is obtained as a quality value (Q).

In order to achieve the above-described object, according to a twenty-fifth aspect of the present invention, there is provided the optical signal monitoring method according to the twenty-third aspect, wherein, in the computation step, pieces of predetermined-bit waveform data are superimposed in the address order to obtain an eye pattern, the predetermined (W) number of data signals being stored in the address order in each time for said plurality (H) of different areas of the waveform memory (39) in the predetermined-bit waveform data.

Thus, in the optical signal synchronization sampling apparatus and method of the invention, the electroabsorption optical modulator is used as the sampling element, the sampling object optical signal is input into one of the optical terminals, the direct-current voltage exhibiting the high absorption index with respect to the sampling object optical signal is imparted to the power supply terminal, the sampling optical pulse is input into another optical terminal of the electroabsorption optical modulator through the photocoupler, the absorption index is lowered with respect to the sampling object optical signal by the mutual absorption saturation characteristics generated when the sampling optical pulse is input, and the sampling object optical signal is supplied from the other optical terminal.

Therefore, the optical pulse having the narrow width can be used as the sampling optical pulse, the loss can be decreased for the sampling object optical signal, the sampling efficiency can substantially be enhanced, and the synchronization sampling of the information on the waveform of the sampling object optical signal can accurately be performed with the sufficient resolution even if the sampling object optical signal is a weak optical signal.

Thus, in the optical signal monitoring apparatus and method of the invention, the electroabsorption optical modulator is used as the sampling element, the monitoring object optical signal is input into one of the optical terminals, the direct-current voltage exhibiting the high absorption index with respect to the monitoring object optical signal is imparted to the power supply terminal, the sampling optical pulse is input into the other optical terminal of the electroabsorption optical modulator through the photocoupler, the absorption index is lowered with respect to the monitoring object optical signal by the mutual absorption saturation characteristics generated when the sampling optical pulse is input, and the monitoring object optical signal is supplied from the other optical terminal.

Therefore, the optical pulse having the narrow width can be used as the sampling optical pulse, the loss can be decreased for the monitoring object optical signal, the sampling efficiency can substantially be enhanced, and the information on the waveform of the monitoring object optical signal can accurately be obtained with the sufficient resolution even if the monitoring object optical signal is a weak optical signal.

The fundamental wave component signal is extracted from the signal obtained by sampling the monitoring object optical signal, and obtaining the waveform information is started at the time the fundamental wave component signal exceeds the threshold value. Therefore, the waveform information obtaining start timing can be synchronized with the data signal which modulates the actually input monitoring object optical signal, and the eye pattern of the monitoring object optical signal can stably be obtained by superimposing the plural pieces of waveform information obtained at the start timing.

BEST MODE FOR CARRYING OUT THE INVENTION

A first embodiment, to which an optical signal synchronization sampling apparatus and an optical signal monitoring apparatus in which the optical signal synchronization sampling apparatus is used are applied, will be described with reference to the accompanying drawings.

Figure 1:
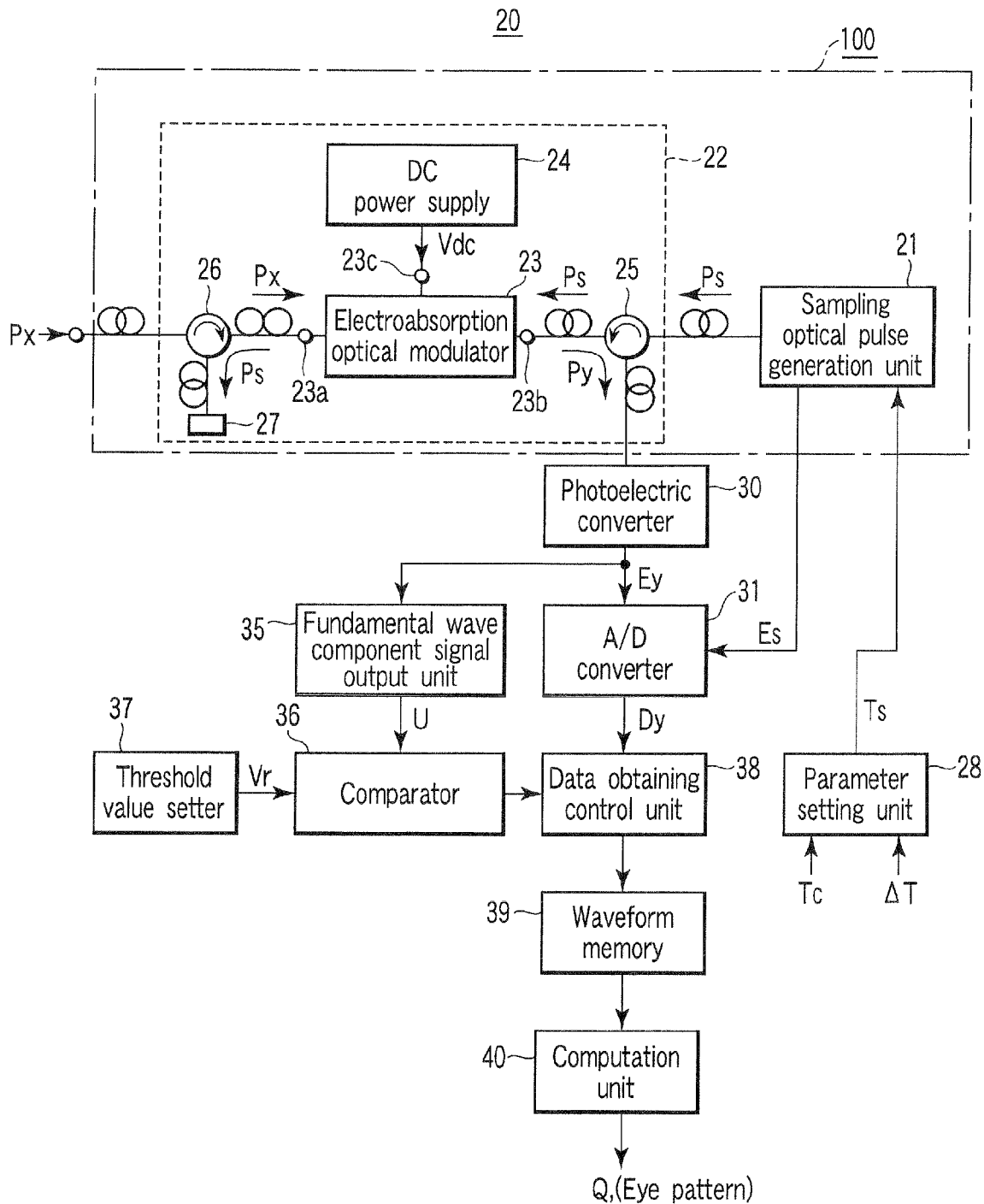
FIG. 1 is a block diagram showing a configuration of an embodiment to which optical signal synchronization sampling apparatus and method according to the invention and optical signal monitoring apparatus and method, in which the optical signal synchronization sampling apparatus and method are used, are applied.

FIG. 1 is a block diagram showing a configuration of the first embodiment of an optical signal synchronization sampling apparatus 100 according to the invention and an optical signal monitoring apparatus 20 using the optical signal synchronization sampling apparatus 100.

A basic configuration of the optical signal synchronization sampling apparatus 100 according to the invention includes a sampling optical pulse generation unit 21 which emits a sampling optical pulse Ps having a period Ts different from a predetermined offset time ΔT to N integral multiplications of a clock period Tc of a data signal, the data signal modulating a sampling object optical signal Px; and an optical sampling unit 22 which supplies an optical pulse signal Py obtained by performing synchronization sampling of the sampling object optical signal Px using the sampling optical pulse Ps emitted by the sampling optical pulse generation unit 21. The optical sampling unit 22 includes an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 receiving the sampling object optical signal Px at one of the two optical terminals 23a and 23b; a direct-current power supply 24 which applies a predetermined direct-current voltage Vdc to the power supply terminal 23c of the electroabsorption optical modulator 23, the electroabsorption optical modulator 23 exhibiting a high absorption index with respect to the sampling object optical signal at the predetermined direct-current voltage Vdc; and a photocoupler 25 which receives the sampling optical pulse Ps to input the sampling optical pulse Ps into another of the two optical terminals 23a and 23b of the electroabsorption optical modulator 23, the sampling optical pulse Ps being emitted by the sampling optical pulse generation unit 21, the photocoupler 25 receiving the sampling object optical signal to output the sampling object optical signal as the optical pulse signal Py, the sampling object optical signal being emitted by the other of the two optical terminals 23a and 23b of the electroabsorption optical modulator 23. When the sampling optical pulse Ps is supplied, the absorption index is lowered by a mutual absorption saturation characteristic of the electroabsorption optical modulator 23, and the sampling object optical signal Px is passed onto a side of the other of the two optical terminals 23a and 23b of the electroabsorption optical modulator 23 to perform the synchronization sampling.

A basic configuration of a optical signal synchronization sampling method according to the invention includes a sampling optical pulse generation step of emitting a sampling optical pulse Ps having a period Ts different from a predetermined offset time ΔT to N integral multiplications of a clock period Tc of a data signal, the data signal modulating a sampling object optical signal Px; and an optical synchronization sampling step of supplying an optical pulse signal Py obtained by performing synchronization sampling of the sampling object optical signal Px using the sampling optical pulse Ps emitted from the sampling optical pulse generation step. The optical synchronization sampling step includes a step of preparing an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 receiving the sampling object optical signal Px at one of the two optical terminals 23a and 23b; a step of preparing a direct-current power supply 24 which applies a predetermined direct-current voltage Vdc to the power supply terminal 23c of the electroabsorption optical modulator 23, the electroabsorption optical modulator 23 exhibiting a high absorption index with respect to the sampling object optical signal Px at the predetermined direct-current voltage Vdc; and a step of preparing a photocoupler 25 which receives the sampling optical pulse Ps to input the sampling optical pulse Ps into the other of the two optical terminals 23a and 23b of the electroabsorption optical modulator 23, the sampling optical pulse Ps being emitted from the sampling optical pulse generation unit 21, the photocoupler 25 receiving the sampling object optical signal Px to output the sampling object optical signal Px as the optical pulse signal Py, the sampling object optical signal Px being emitted from the other of the two optical terminals 23a and 23b of the electroabsorption optical modulator 23. When the sampling optical pulse is supplied, the absorption index is lowered by a mutual absorption saturation characteristic of the electroabsorption optical modulator 23, and the sampling object optical signal Px is passed onto a side of the other of the two optical terminals 23a and 23b of the electroabsorption optical modulator 23 to perform the synchronization sampling.

A basic configuration of the optical signal monitoring apparatus 20 according to the invention includes an optical signal synchronization sampling apparatus 100 including a sampling optical pulse generation unit 21 which emits a sampling optical pulse Ps having a period Ts different from a predetermined offset time ΔT to N integral multiplications of a clock period Tc of a data signal, the data signal modulating a monitoring object optical signal Px and an optical sampling unit 22 which supplies an optical pulse signal Py obtained by performing synchronization sampling of the monitoring object optical signal using the sampling optical pulse Ps emitted from the sampling optical pulse generation unit 21; a photoelectric converter 30 which receives light of the optical pulse signal Py supplied from the optical sampling unit 22 of the optical signal synchronization sampling apparatus 100, and converts the optical pulse signal Py into an electric signal Ey to supply the electric signal Ey; fundamental wave component signal output means 35 for supplying a fundamental wave component signal U having a frequency identical to that of a fundamental wave component of an envelope curve of the electric signal Ey supplied from the photoelectric converter 30; a comparator 36 which compares the fundamental wave component signal U supplied from the fundamental wave component signal output unit 35 and a predetermined threshold value Vr; and a data obtaining control unit 38 which starts to obtain information on a waveform of the electric signal Ey supplied from the photoelectric converter 30 at a time the fundamental wave component signal U exceeds the threshold value Vr in the comparison performed by the comparator 36. The optical sampling unit 22 of the optical signal synchronization sampling apparatus 100 includes an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 receiving the monitoring object optical signal at one of the two optical terminals 23a and 23b; a direct-current power supply 24 which applies a predetermined direct-current voltage Vdc to the power supply terminal 23c of the electroabsorption optical modulator 23, the electroabsorption optical modulator 23 exhibiting a high absorption index with respect to the monitoring object optical signal Px at the predetermined direct-current voltage Vdc; and a photocoupler 25 which receives the sampling optical pulse Ps to input the sampling optical pulse Ps into another of the two optical terminals 23a and 23b of the electroabsorption optical modulator 23, the sampling optical pulse Ps being emitted from the sampling optical pulse generation unit 21, the photocoupler 25 receiving the monitoring object optical signal Px to input the monitoring object optical signal Px as the optical pulse signal Py into the photoelectric converter 30, the monitoring object optical signal Px being emitted from the other of the two optical terminals 23a and 23b of the electroabsorption optical modulator 23. When the sampling optical pulse Ps is supplied, the absorption index is lowered by a mutual absorption saturation characteristic of the electroabsorption optical modulator 23, and the monitoring object optical signal Px is passed onto a side of the other of the two optical terminals 23a and 23b of the electroabsorption optical modulator 23 to perform the synchronization sampling.

A basic configuration of an optical signal monitoring method according to the invention includes a sampling optical pulse generation step of emitting a sampling optical pulse Ps having a period Ts different from a predetermined offset time ΔT to N integral multiplications of a clock period Tc of a data signal, the data signal modulating a monitoring object optical signal Px; an optical synchronization sampling step of supplying an optical pulse signal Py obtained by performing synchronization sampling of the monitoring object optical signal Px using the sampling optical pulse Ps emitted from the sampling optical pulse generation step; a photoelectric conversion step of receiving light of the optical pulse signal Py supplied from the optical synchronization sampling step, and converting the optical pulse signal Py into an electric signal Ey to supply the electric signal Ey; a fundamental wave component signal output step of supplying a fundamental wave component signal U having a frequency identical to that of a fundamental wave component of an envelope curve of the electric signal Ey supplied from the photoelectric conversion step; a comparison step of comparing the fundamental wave component signal U supplied from the fundamental wave component signal output step and a predetermined threshold Vr; and a data obtaining control step of starting to obtain information on a waveform of the electric signal Ey supplied from the photoelectric conversion step at a time the fundamental wave component signal U exceeds the threshold Vr in the comparison performed in the comparison step. The optical synchronization sampling step includes a step of preparing an electroabsorption optical modulator 23 which has two optical terminals 23a and 23b and a power supply terminal 23c, the two optical terminals 23a and 23b being used to input and output light, the power supply terminal 23c imparting an electric field to an optical path connecting the two optical terminals 23a and 23b, the electroabsorption optical modulator 23 having a characteristic in which an absorption index is changed with respect to the light propagating through the optical path according to a level of the electric field, the electroabsorption optical modulator 23 receiving the monitoring object optical signal Px at one of the two optical terminals 23a and 23b; a step of preparing a direct-current power supply 24 which applies a predetermined direct-current voltage Vdc to the power supply terminal 23c of the electroabsorption optical modulator 23, the electroabsorption optical modulator 23 exhibiting a high absorption index with respect to the sampling object optical signal Px at the predetermined direct-current voltage Vdc; and a step of preparing a photocoupler 25 which receives the sampling optical pulse Ps to input the sampling optical pulse Ps into another of the two optical terminals 23a and 23b of the electroabsorption optical modulator 23, the sampling optical pulse Ps being emitted from the sampling optical pulse generation step, the photocoupler 25 receiving the monitoring object optical signal Px to output the monitoring object optical signal Px as the optical pulse signal Py, the monitoring object optical signal Px being emitted from the other of the two optical terminals 23a and 23b of the electroabsorption optical modulator 23. When the sampling optical pulse Ps is supplied, the absorption index is lowered by a mutual absorption saturation characteristic of the electroabsorption optical modulator 23, and the monitoring object optical signal Px is passed onto a side of the other of the two optical terminals 23a and 23b of the electroabsorption optical modulator 23 to perform the synchronization sampling.

The optical signal monitoring apparatus 20 and optical signal monitoring method in which the optical signal synchronization sampling apparatus 100 and optical signal synchronization sampling method to which the invention is applied are used will specifically be described below.

In the optical signal monitoring apparatus 20 and optical signal monitoring method in which the optical signal synchronization sampling apparatus 100 and optical signal synchronization sampling method to which the invention is applied are used, the optical signal Px is set to a monitoring (sampling) object. The optical signal Px is modulated by the data signal which is transmitted on an optical network (not shown), and the optical signal Px has the predetermined clock period Tc.

The sampling optical pulse generation unit 21 produces a sampling optical pulse Ps to supply the sampling optical pulse Ps to the optical sampling unit 22. The sampling optical pulse Ps has a period Ts different from the N integral multiplications of the clock period Tc of the data signal by the predetermined offset time ΔT, and the data signal modulates the optical signal Px of the monitoring target.

At this point, the optical signal synchronization sampling apparatus 100 to which the invention is applied includes the sampling optical pulse generation unit 21 and the optical sampling unit 22.

Any configuration may be adopted for the sampling optical pulse generation unit 21 as long as the sampling optical pulse generation unit 21 can produce the period Ts in which the optical pulse having the narrow width is specified.

Figure 2:
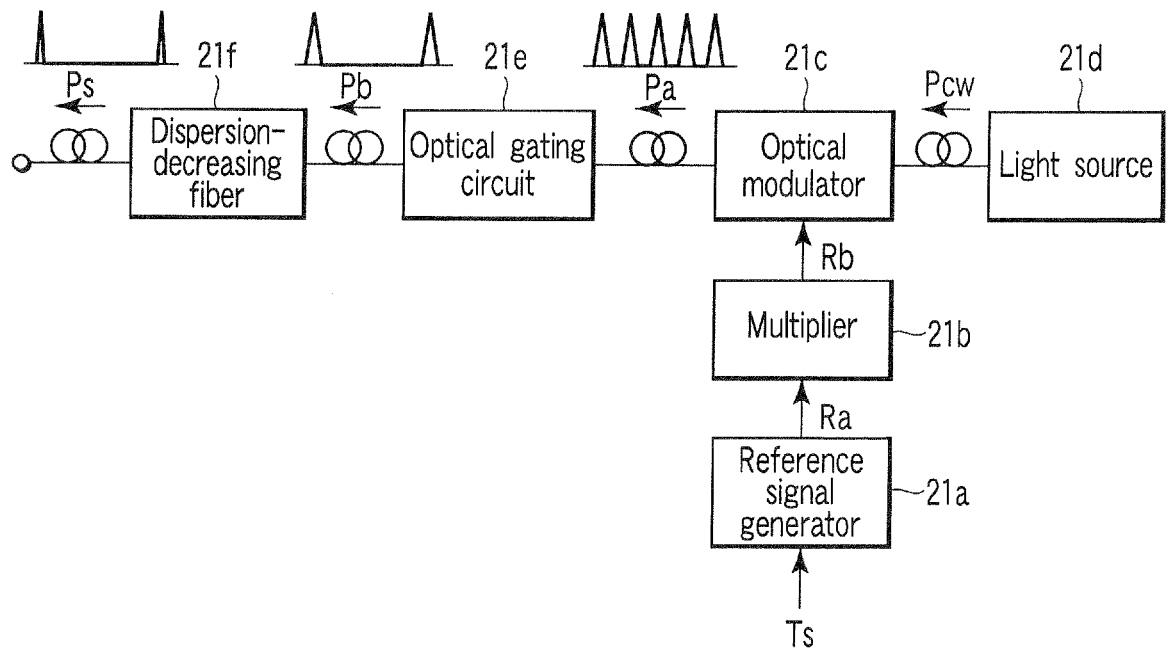
FIG. 2 is a block diagram showing a configuration example of a main part of FIG. 1.

FIG. 2 is a block diagram showing an example of the sampling optical pulse generation unit 21.

The sampling optical pulse generation unit 21 includes a reference signal generator 21a having a synthesizer configuration in which a stable signal Ra is produced, the stable signal Ra having the period Ts corresponding to a period of the sampling optical pulse Ps; a multiplier 21b which supplies the stable signal Ra in a form of a signal Rb multiplied by a factor of M (M is more than one), the stable signal Ra being produced by the reference signal generator 21a and having the period Ts (frequency Fs); a light source 21d which emits continuous light Pcw; an optical modulator 21c which modulates the continuous light Pcw by the signal Rb multiplied by the factor of M, thereby emitting an optical pulse Pa having a period Ts/M, the continuous light Pcw being emitted from the light source 21d, the signal Rb being supplied from the multiplier 21b; an optical gating circuit 21e which thins out the optical pulse Pa emitted from the optical modulator 21c into 1/M, and converts the optical pulse Pa into an optical pulse Pb having the period Ts; and a dispersion-decreasing fiber 21f which narrows a pulse width of the optical pulse Pb having the period Ts, the optical pulse Pb being converted by the optical gating circuit 21e, and supplies the optical pulse in a form of the sampling optical pulse Ps.

The reference signal generator 21a having the synthesizer configuration produces the stable signal Ra having the period Ts (frequency Fs) specified by a parameter setting unit 28 described later. The stable signal Ra is input into the multiplier 21b, which multiplies the stable signal Ra by a factor of M (M is more than one). Then, the output signal Rb is input into the optical modulator 21c, which modulates the continuous light Pcw emitted from the light source 21d, thereby generating the optical pulse Pa having the period Ts/M.

The pulse width of the optical pulse Pa is narrowed to 1/M in comparison with the case where the continuous light Pcw is directly modulated by the signal Ra.

The optical gating circuit 21e thins out the optical pulse Pa into 1/M, and the optical pulse Pa is converted into the optical pulse Pb having the period Ts. Then, the optical pulse Pb is input into the dispersion-decreasing fiber 21f to narrow the pulse width of the optical pulse Pb, and the optical pulse Pb is finally supplied as the sampling optical pulse Ps.

On the other hand, the optical sampling unit 22 performs the sampling of the monitoring (sampling) object optical signal Px using the sampling optical pulse Ps emitted from the sampling optical pulse generation unit 21, and supplies the optical pulse signal Py obtained by the sampling.

The optical sampling unit 22 includes the electroabsorption optical modulator 23, the direct-current power supply 24, and the circulator type photocoupler 25.

As described above, the electroabsorption optical modulator 23 has the two optical terminals 23a and 23b and the power supply terminal 23c. The two optical terminals 23a and 23b are used to input and output light, and the power supply terminal 23c imparts the electric field to the optical path between the two optical terminals 23a and 23b. The electroabsorption optical modulator 23 has the characteristic in which the absorption index is changed with respect to the light propagating through the optical path according to the level of the electric field imparted to the optical path.

As disclosed in Patent Document 2, usually an electric sampling pulse signal is imparted to the power supply terminal 23c in the electroabsorption optical modulator 23.

In the case of the electric sampling pulse signal, as described above, it is extremely difficult to produce the electric sampling pulse signal having the narrow width necessary to obtain the information on the waveform of tens of Gb/s.

Therefore, in the invention, as shown in FIG. 1, the optical signal Px is input into the optical terminal 23a of the electroabsorption optical modulator 23, the sampling optical pulse Ps having the narrow width is input into the other optical terminal 23b through the photocoupler 25 while the predetermined direct-current voltage Vd exhibiting the high absorption index for the optical signal Px is imparted from the direct-current power supply 24 to the power supply terminal 23c, the mutual absorption saturation characteristic of the electroabsorption optical modulator 23 is utilized to change the absorption index using the sampling optical pulse Ps, and the absorption index is lowered for the monitoring (sampling) object optical signal Px only when the sampling optical pulse Ps is input. Therefore, the monitoring (sampling) object optical signal Px is passed through the optical terminal 23b to perform the sampling using the optical sampling pulse signal.

When the electroabsorption optical modulator 23 is used as the element for sampling the optical signal to perform the sampling with the optical sampling pulse signal, the sampling efficiency is determined by the insertion loss of the electroabsorption optical modulator 23.

Because the electroabsorption optical modulator 23 has the insertion loss of about −10 dB, the sampling efficiency of the invention becomes about −10 dB.

In the invention, the sampling efficiency of about −10 dB is improved by about 10 dB or more in comparison with the case where the non-linear optical material having the sampling efficiency of about −20 dB or less is used as the element for sampling the optical signal like Patent Document 1.

Figure 3:
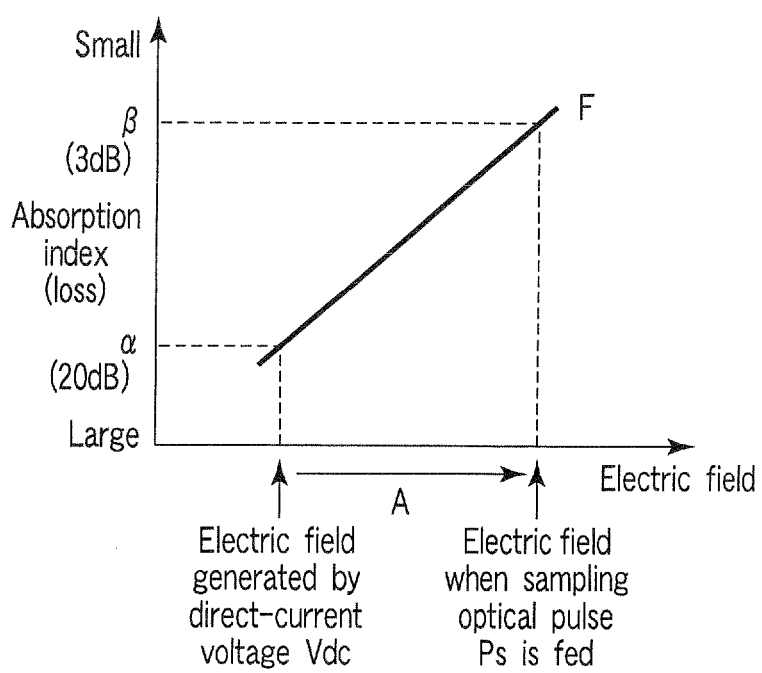
FIG. 3 is a view for explaining a characteristic example of the main part of FIG. 1.

In the case where a change in characteristic of the absorption index with respect to the electric field of the electroabsorption optical modulator 23 is shown by the letter F of FIG. 3, it is assumed that the direct-current voltage Vdc corresponding to the electric field in which the absorption index becomes a large value α (for example, 20 dB) is applied to the power supply terminal 23c of the electroabsorption optical modulator 23.

The sampling optical pulse Ps is input into the optical terminal 23b of the electroabsorption optical modulator 23 such that the electric field is substantially changed to a direction of an arrow A of FIG. 3 by the mutual absorption saturation characteristics to decrease the absorption index having peak intensity of a small value β (for example, 3 dB).

The characteristic F is schematically shown in FIG. 3.

That is, when the sampling optical pulse Ps is input into the optical terminal 23b of the electroabsorption optical modulator 23, the absorption index of electroabsorption optical modulator 23 is lowered by the mutual absorption saturation characteristic of the electroabsorption optical modulator 23.

Therefore, the monitoring (sampling) object optical signal Px fed into the optical terminal 23a of the electroabsorption optical modulator 23 is permitted to be passed through the electroabsorption optical modulator 23 as the optical pulse signal Py which has the peak value lower than the instantaneous intensity value at that time by a level corresponding to the insertion loss of the electroabsorption optical modulator 23.

Thus, the monitoring (sampling) object optical signal Px passed through the electroabsorption optical modulator 23 is supplied as the optical pulse signal Py from the optical terminal 23b of the electroabsorption optical modulator 23 through the photocoupler 25 of the optical sampling unit 22.

Not only the circulator type in which the optical path is divided according to the light beam incident direction but also a spectral type in which the optical path is divided depending on a difference in wavelength can be used as the photocoupler 25 of the optical sampling unit 22. The sampling optical pulse Ps having the wavelength different from that of the optical signal Px is used in the case of the spectral type.

In the circulator type photocoupler 26 inserted in the optical terminal 23a of the electroabsorption optical modulator 23, an optical terminator 27 terminates the sampling optical pulse Ps which is input into the optical terminal 23b and supplied from the optical terminal 23a in order to prevent the incidence (leakage) of the monitoring object optical signal Px into the transmission path.

A parameter setting unit 28 sets the periods Ts of the sampling optical pulse Ps and sampling clock Es, which are supplied from the sampling optical pulse generation unit 21.

The parameter setting unit 28 receives the information on the clock period Tc (or bit rate) of the data signal modulating the monitoring object optical signal Px and the information on the offset time ΔT, and obtains the sampling period Ts from the computation of $$Ts = N \cdot Tc + \Delta T$$

to set the sampling period Ts in the sampling optical pulse generation unit 21.

At this point, the value of N is determined by the clock period Tc of the data signal and the frequency variable range of the signal which can be supplied from the sampling optical pulse generation unit 21.

For example, it is assumed that the offset time ΔT is so small that the offset time ΔT is negligible for the sampling period Ts, and that the clock period Tc is about 0.1 ns (10 GHz) while the sampling period Ts can be changed around 0.1 μs (10 MHz). Then, the value of N becomes about Ts/Tc=1000.

As described above, the optical pulse signal Py supplied through the photocoupler 25 of the optical sampling unit 22 is input into the photoelectric converter 30, whereby the photoelectric converter 30 converts the optical pulse signal Py into the electric signal Ey and outputs the electric signal Ey.

The analog/digital (A/D) converter 31 performs the sampling of the electric signal Ey supplied from the photoelectric converter 30, and converts the electric signal Ey into the digital value.

The sampling performed by the A/D converter 31 is performed using a sampling clock Es synchronized with the sampling optical pulse Ps.

In the embodiment, it is assumed that the electric sampling clock Es is also supplied from the sampling optical pulse generation unit 21 (the reference signal generator 21a).

The electric signal Ey is also output from the photoelectric converter 30 to the fundamental wave component signal output unit 35.

The fundamental wave component signal output unit 35 is used to output a fundamental wave component signal U having the same frequency as the fundamental wave component of the envelope curve wave of the pulsed electric signal Ey. The pulsed electric signal Ey is supplied from the photoelectric converter 30.

A filter system and a PLL (Phase-Locked Loop) system can be cited as an example of the configuration of the fundamental wave component signal output unit 35.

Figure 4:
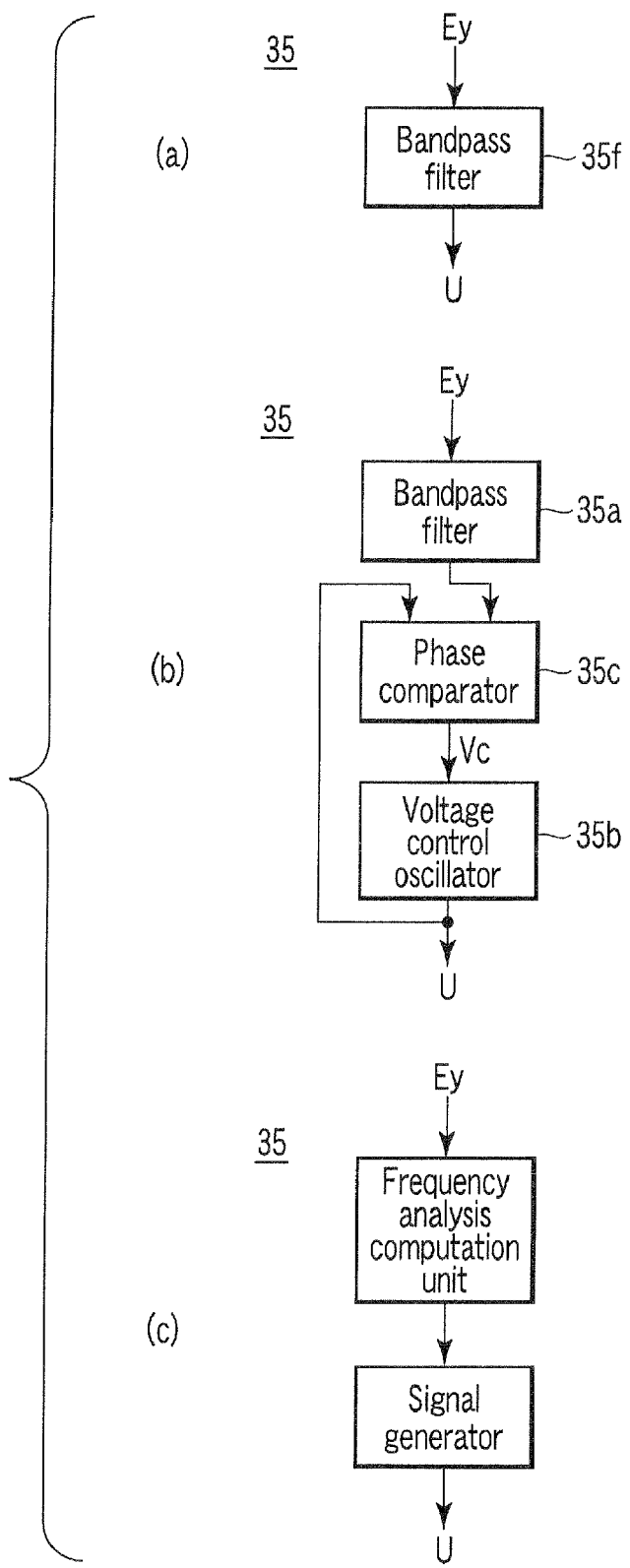
FIG. 4 is a block diagram for explaining a configuration example of the main part of FIG. 1.

In the case of the filter system, as shown in (a) of FIG. 4, the sinusoidal fundamental wave component signal U is extracted by a narrowband bandpass filter 35f having the same center frequency (in the case of an RZ system) as the clock frequency Fc of the data signal modulating the monitoring object optical signal Px or a center frequency (in the case of an NRZ system) double the clock frequency Fc.

In the case of the PLL system, as shown in (b) of FIG. 4, the fundamental wave component signal output unit 35 includes a narrowband bandpass filter 35a which has a center frequency equal to the clock frequency Fc of the data signal modulating the monitoring object optical signal Px or a center frequency double the clock frequency Fc, and extracts the sinusoidal fundamental wave component signal from the electric signal Ey supplied from the photoelectric converter 30; a voltage control oscillator 35b which supplies an oscillation output signal having a predetermined oscillation frequency; and a phase comparator 35c which supplies a control signal Vc according to a phase difference between the output signal of the bandpass filter 35a and the output signal of the voltage control oscillator 35b. The fundamental wave component signal output unit 35 controls the oscillation frequency of the voltage control oscillator 35b by the control signal Vc supplied from the phase comparator 35c and synchronizes a phase of the oscillation output signal with a phase of the output signal of the bandpass filter 35a, whereby the fundamental wave component signal output unit 35 supplies the synchronized sinusoidal oscillation output signal in the form of the fundamental wave component signal U.

That is, in the case of the PLL system, the bandpass filter 35a has the narrowband bandpass characteristic similar to that of the narrowband bandpass filter 35f in the case of the filter system, the output signal of the bandpass filter 35a and the output signal of the voltage control oscillator 35b are input into the phase comparator 35c, the oscillation frequency of the voltage control oscillator 35b is controlled by the control signal Vc according to the phase difference between the output signals, the phase of the oscillation output signal is synchronized with the phase of the output signal of the bandpass filter 35a, and the synchronized sinusoidal oscillation output signal is used as the fundamental wave component signal 5U.

Alternatively, as shown in (c) of FIG. 4, the electric signal Ey supplied from the photoelectric converter 30 is input into an FFT (Fast Fourier Transform) frequency analysis computation unit 35g, the frequency of the electric signal Ey is analyzed to obtain the frequency of the fundamental wave component, and the fundamental wave component signal U having the frequency equal to the obtained frequency of the fundamental wave component may be generated and supplied from a signal generator 35h.

Assuming that the monitoring object optical signal Px has the clock frequency Fc of 10 GHz and the offset time ΔT is set to 0.1 ps, 1000-time sampling is required to obtain the one-bit waveform data of the monitoring object optical signal Px, and a time necessary to perform the 1000-time sampling at the frequency Fs of about 10 MHz becomes 0.1 ms. The time of 0.1 ms is equal to a period of the fundamental wave component of the envelope curve wave of the electric signal Ey, and the frequency becomes about 10 kHz.

The fundamental wave component signal U is input into the comparator 36, the comparator 36 compares the fundamental wave component signal U with the predetermined threshold value Vr preset by a threshold value setter 36, and the comparison result is fed into the data obtaining control unit 38.

The data obtaining control unit 38 writes the data signal Dy supplied from the A/D converter 31 in the waveform memory 39 based on the output signal supplied from the comparator 36.

That is, the data obtaining control unit 38 starts to write the data signal Dy in the waveform memory 39 at a time the fundamental wave component signal U exceeds the threshold value Vr from the lower side, and the data obtaining control unit 38 stands by until the fundamental wave component signal U exceeds the threshold value Vr from the lower side after the predetermined number W of data signals Dy are written. The data obtaining control unit 38 repeats the operation predetermined times H.

The predetermined number W of data signals Dy is written in an address order in plural different areas H of the waveform memory 39.

A computation unit 40 computes a value indicating quality of the monitoring object optical signal Px based on the data signal Dy written in the waveform memory 39.

Any computation technique may be used to compute the value indicating the quality of the monitoring object optical signal Px using the computation unit 40. For example, as described in Patent Document 1, the data signal Dy written in the waveform memory 39 is compared with a predetermined threshold value to classify the data signals Dy into a sample value belonging to data "1" and a sample value belonging to data "0", an average value and a standard deviation of a group of the sample values are obtained for each of the data "1" and the data "0", and a ratio μ/γ of a difference μ of the average values and the sum γ of the standard deviations are obtained as a quality value Q.

It is shown that the quality of the monitoring object optical signal Px is enhanced as the Q value is increased.

A waveform of the monitoring object optical signal Px and timing at which the data obtaining control unit 38 obtains the waveform will be described below.

Figure 5:
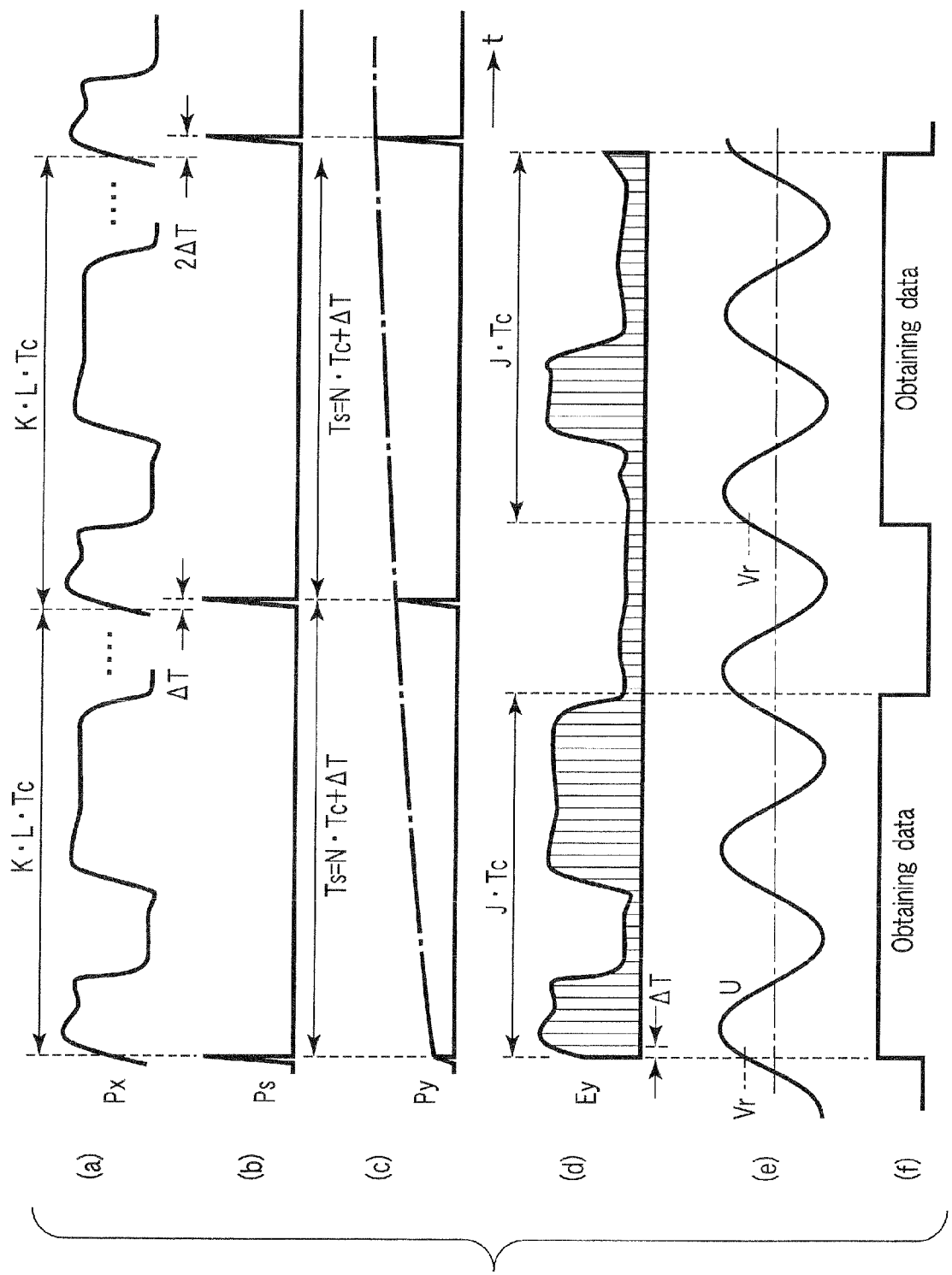
FIG. 5 is a waveform chart for explaining an operation with respect to an optical signal having a repetitive waveform, which is an operation of the embodiment performed by the configuration of FIG. 1.

It is assumed that the monitoring object optical signal Px is produced for a test and repeatedly modulated by a predetermined code string having a predetermined bit length L as shown in (a) of FIG. 5.

It is assumed that the sampling is performed to the monitoring object optical signal Px while the value of N determining the period Ts of the sampling optical pulse Ps is equal to integral multiplications K of the bit length L as shown in (b) of FIG. 5.

The optical pulse signal Py is obtained by the sampling, and the optical pulse signal Py has the envelope curve waveform in which a temporal axis of the monitoring object optical signal Px is enlarged as shown in (c) of FIG. 5.

The electric signal Ey shown in (d) of FIG. 5 is obtained from the optical pulse signal Py.

The sinusoidal fundamental wave component signal U shown in (e) of FIG. 5 is obtained from the electric signal Ey.

As shown in (f) of FIG. 5, obtaining the data is started at the time the fundamental wave component signal U exceeds the threshold value Vr, the data is obtained by the J·Tc/ΔT-time (J is an integer) sampling, and the data is stored in the waveform memory 39.

The computation unit 40 performs computation to the J-bit waveform data Dy stored in the waveform memory 39, which allows the Q value to be obtained.

Furthermore, (d) to (f) of, FIG. 5 show the repetitive waveforms while the temporal axes are narrowed.

In the case where an eye pattern is obtained, as shown in (d) to (f) of FIG. 5, obtaining the waveform data is started at the time the fundamental wave component signal U exceeds the threshold value Vr, and the processing for obtaining the J-bit waveform data Dy is performed plural times H.

Figure 6:
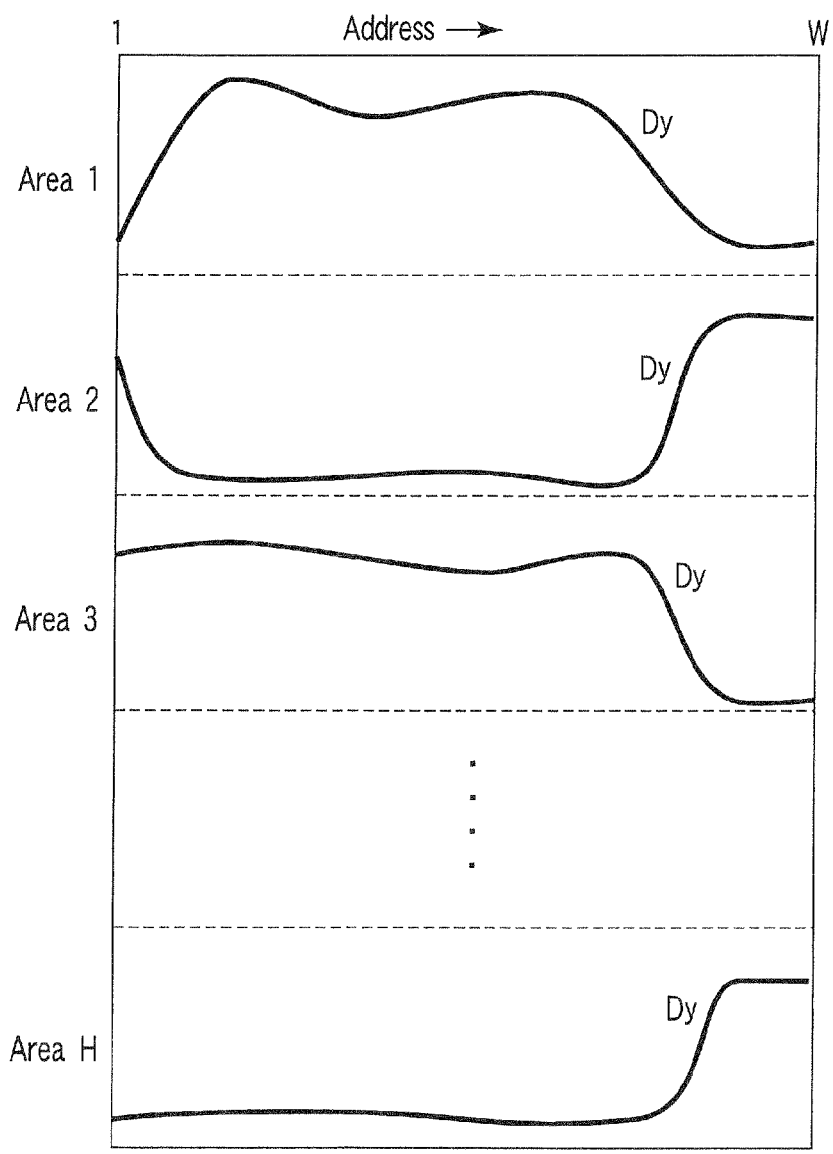
FIG. 6 is a waveform chart for explaining a storage example of a waveform obtained by sampling, which is an operation of the embodiment performed by the configuration of FIG. 1.

As shown in FIG. 6, the pieces of J-bit waveform data Dy obtained plural times H are stored every time in different areas 1 to H of the waveform memory 39.

Figure 7:
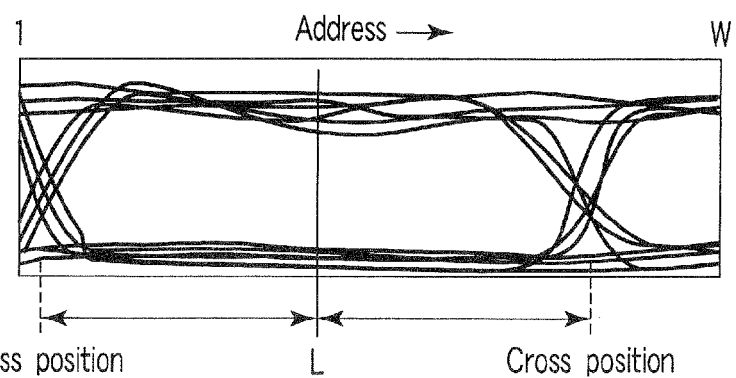
FIG. 7 is a waveform chart for explaining an eye pattern obtained by superimposing the waveforms stored in FIG. 6.

The eye pattern shown in FIG. 7 can be obtained by superimposing the pieces of J-bit waveform data Dy stored every time in the different areas 1 to H of the waveform memory 39 in the address order.

Leading-end data of each piece of waveform data is obtained by the sampling immediately after the fundamental wave component signal U exceeds the threshold value Vr, and the leading-end data is correctly synchronized with the data signal. Therefore, the pieces of waveform data are not superimposed while the temporal axes of the pieces of waveform data are largely shifted from one another, but a variation in amplitude of the monitoring object optical signal Px is substantially correctly shown.

A relationship between the position and the quality within the bit is obtained on the eye pattern shown in FIG. 7.

For example, the Q value is computed based on a sample value at a midpoint L (midpoint of one bit) of two cross positions as shown in FIG. 7.

A notification of the computed Q value is made to other devices through communication means (not shown) along with a Q value obtained by the whole of the pieces of data which are unrelated to the midpoint L.

Figure 8:
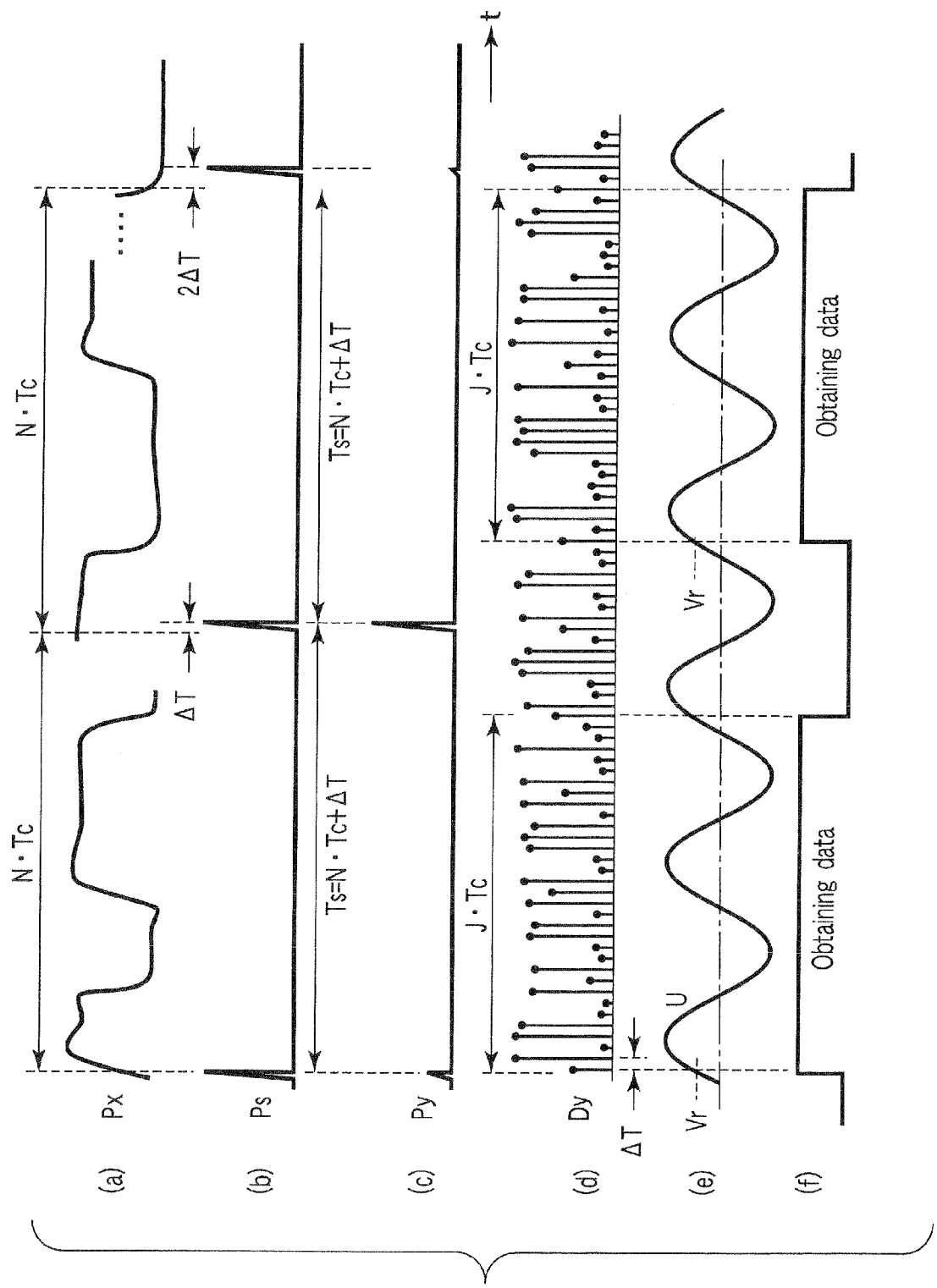
FIG. 8 is a waveform chart for explaining an operation with respect to an optical signal having a non-repetitive waveform, which is an operation of the embodiment performed by the configuration of FIG. 1.
Figure 9:
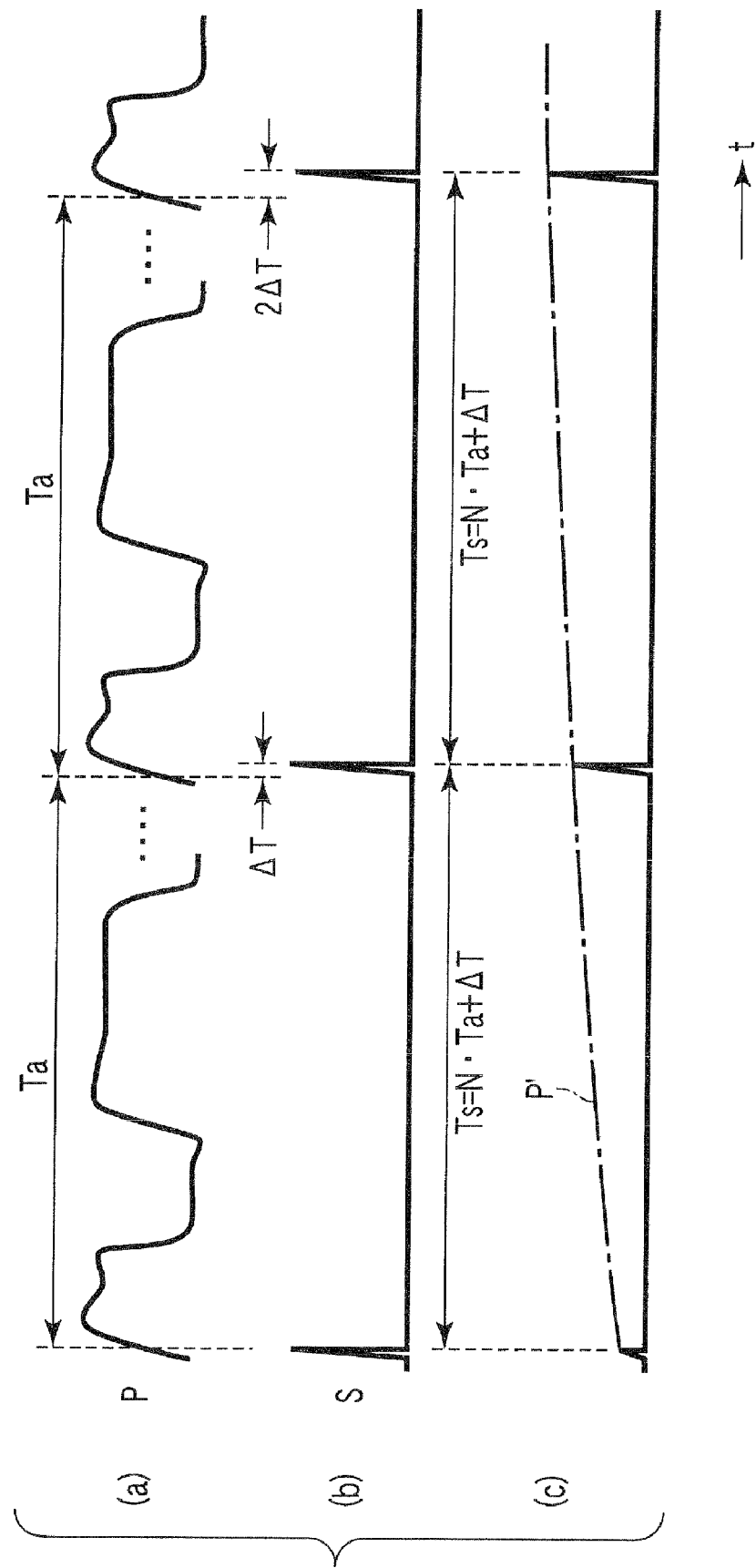
FIG. 9 is a waveform chart for explaining an equivalent time sampling method adopted in a conventional optical signal sampling apparatus.

As shown in (a) of FIG. 8, the optical signal Px actually transmitted on an optical network does not have the simply repetitive waveform.

In the case where the sampling is performed to the optical signal Px which does not have the simply repetitive waveform using the sampling optical pulse Ps having the period Ts of N·Tc+ΔT as shown in FIG. 8B, the sampling is performed to every N-bit data of the optical signal Px at timing shifted by ΔT.

The peak value of the optical pulse signal Py obtained by the sampling becomes either an amplitude corresponding to the data "1" or the data "0" or an amplitude in a transition state between the data "1" and the data "0" as shown in (c) of FIG. 8 and as shown in (d) of FIG. 8 in which the temporal axis in (c) of FIG. 8 is narrowed. Therefore, the envelope curve wave, in which the consecutive waveforms of a constant interval of the optical signal Px are enlarged, cannot be obtained.

Because the envelope curve wave includes the fundamental wave component of the data signal modulating the optical signal Px, the fundamental wave component signal U is obtained as shown in (e) of FIG. 8.

Similarly, as shown in FIG. 8F, obtaining the data is started at the time the fundamental wave component signal U exceeds the threshold Vr, and the data is obtained by the J·Tc/ΔT-time (J is an integer) sampling.

The computation unit 40 performs computation to the J-bit waveform data Dy, which allows the Q value to be obtained.

Furthermore, (d) to (f) of FIG. 8 show the repetitive waveforms while the temporal axes are narrowed.

It is also can be say that the J-bit waveform data indicates the eye pattern.

In the case where the eye pattern more correctly indicating the quality of the optical signal is obtained using the more sample values, as shown in (d) to (f) of FIG. 8, obtaining the data is started at the time the fundamental wave component signal U exceeds the threshold Vr, and the processing for obtaining the pieces of J-bit waveform data Dy is performed plural times H.

Similarly the pieces of J-bit waveform data Dy obtained plural times H are stored every time in the different areas 1 to H of the waveform memory 39.

The correct eye pattern can be obtained by superimposing the pieces of J-bit waveform data Dy stored every time in the plural different areas 1 to H of the waveform memory 39 in the address order.

In this case, the leading-end data of each piece of waveform data is also obtained by the sampling immediately after the fundamental wave component signal U exceeds the threshold value Vr, and the leading-end data is correctly synchronized with the data signal. Therefore, the pieces of waveform data are not superimposed while the temporal axes of the pieces of waveform data are largely shifted from one another, but the variation in amplitude of the monitoring object optical signal Px is substantially correctly shown.

As described above, in the optical signal monitoring apparatus 20, the electroabsorption optical modulator 23 is used as the sampling element, the monitoring object optical signal Px is input into the optical terminal 23a of the electroabsorption optical modulator 23, the direct-current voltage Vdc exhibiting the high absorption index for the monitoring object optical signal Px is applied to the power supply terminal 23c, the sampling optical pulse Ps is input into the optical terminal 23b of the electroabsorption optical modulator 23 through the photocoupler 25, and the absorption index for the monitoring object optical signal Px is lowered by the mutual absorption saturation characteristic generated in feeding the sampling optical pulse Ps into the optical terminal 23b, whereby the monitoring object optical signal Px is sampled and supplied from the optical terminal 23b of the electroabsorption optical modulator 23.

Accordingly, in the optical signal monitoring apparatus 20, the sampling efficiency can be improved for the monitoring object optical signal Px while the optical pulse having the narrow width is used in the sampling, so that the information on the waveform can accurately be obtained even if the monitoring object optical signal Px is the weak optical signal.

Additionally, in the optical signal monitoring apparatus 20, the fundamental wave component signal U is obtained from the electric signal Ey obtained by sampling the monitoring object optical signal Px, and the waveform obtaining start timing is synchronized. Therefore, even if the data signals Dy obtained in different intervals are superimposed, a risk of largely shifting the temporal axis can be eliminated to stably obtain the eye pattern of the monitoring object optical signal Px.

In the embodiment, the quality value of the monitoring object optical signal Px and the eye pattern are obtained by the computation unit 40. Alternatively, the computation unit 40 is omitted, the data written in each area of the waveform memory 39 is transmitted to another external device through communication means (not shown), and the computation processing of the quality of the monitoring object optical signal Px and the display of the eye pattern may be performed on the side of the another device.

The optical signal synchronization sampling apparatus and method according to the invention can be applied not only to the optical signal monitoring apparatus and method, but also to an optical sampling oscilloscope and an optical spectrum analyzer.

Thus, the invention can provide the optical signal synchronization sampling apparatus and method, in which the sampling of the high-speed optical signal waveform information can accurately be performed with the high sampling efficiency and sufficient resolution while the problems of the conventional techniques are solved, and the optical signal monitoring apparatus and method in which the eye pattern of the optical signal can stably be obtained while the optical signal is correctly monitored using the optical signal synchronization sampling apparatus and method.

The invention claimed is:

1. An optical signal synchronization sampling apparatus comprising:
a sampling optical pulse generation unit which emits a sampling optical pulse having a period Ts different from a predetermined offset time ΔT to integral N multiplication of a clock period Tc of a data signal, the data signal modulating a sampling object optical signal; and
an optical sampling unit which supplies an optical pulse signal obtained by performing synchronization sampling of the sampling object optical signal using the sampling optical pulse emitted by the sampling optical pulse generation unit,
wherein the optical sampling unit includes:
an electroabsorption optical modulator which has two optical terminals and a power supply terminal, the two optical terminals being used to input and output light, the power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the sampling object optical signal at one of the two optical terminals;
a direct-current power supply which applies a predetermined direct-current voltage to the power supply terminal of the electroabsorption optical modulator, the electroabsorption optical modulator exhibiting a high absorption index with respect to the sampling object optical signal at the predetermined direct-current voltage; and
a photocoupler which receives the sampling optical pulse to input the sampling optical pulse into another of the two optical terminals of the electroabsorption optical modulator, the sampling optical pulse being emitted by the sampling optical pulse generation unit, the photocoupler receiving the sampling object optical signal to output the sampling object optical signal as the optical pulse signal, the sampling object optical signal being emitted by the other of the two optical terminals of the electroabsorption optical modulator, and
wherein when the sampling optical pulse is input, the absorption index is lowered by a mutual absorption saturation characteristic of the electroabsorption optical modulator, and the sampling object optical signal is passed onto a side of the other of the two optical terminals of the electroabsorption optical modulator to perform the synchronization sampling.

2. The optical signal synchronization sampling apparatus according to claim 1, wherein, in order to prevent leakage of the sampling optical pulse to a transmission path of the sampling object optical signal, the sampling optical pulse being input into the other of the two optical terminals of the electroabsorption optical modulator,
the optical sampling unit further includes:
a second photocoupler which is inserted into the one of the two optical terminals of the electroabsorption optical modulator; and
an optical terminator which terminates the sampling optical pulse through the second photocoupler.

3. The optical signal synchronization sampling apparatus according to claim 1, wherein the sampling optical pulse generation unit includes:
a reference signal generator having a synthesizer configuration in which a stable signal is produced, the stable signal having a period corresponding to a period of the sampling optical pulse;
a multiplier which supplies the stable signal as a signal multiplied by a factor of M (M is more than one), the stable signal being produced by the reference signal generator and having the period Ts;
a light source which emits continuous light;
an optical modulator which modulates the continuous light emitted from the light source by the signal multiplied by the factor of M, thereby supplying an optical pulse having a period, the signal being supplied from the multiplier;
an optical gating circuit which thins out the optical pulse emitted from the optical modulator into 1/M, and converts the optical pulse into an optical pulse having the period; and
a dispersion-decreasing fiber which narrows a pulse width of the optical pulse having the period and converted by the optical gating circuit, and supplies the optical pulse in a form of the sampling optical pulse.

4. The optical signal synchronization sampling apparatus according to claim 1, further comprising a parameter setting unit which receives information on a clock period Tc of the data signal modulating the sampling object optical signal or information on a bit rate of the data signal and information on the predetermined offset time to obtain a sampling period Ts of the sampling optical pulse from computation of $$Ts = N \cdot Tc + \Delta T$$

(where a value of N is determined by the clock period Tc of the data signal and a frequency variable range of a signal which can be supplied from the sampling optical pulse generation unit),
the parameter setting unit setting the sampling period Ts of the sampling optical pulse in the sampling optical pulse generation unit.

5. An optical signal monitoring apparatus comprising:
an optical signal synchronization sampling apparatus including a sampling optical pulse generation unit which emits a sampling optical pulse having a period Ts different from a predetermined offset time $\Delta T$ to integral multiplication of a clock period Tc of a data signals the data signal modulating a monitoring object optical signal and an optical sampling unit which supplies an optical pulse signal obtained by performing synchronization sampling of the monitoring object optical signal using the sampling optical pulse emitted by the sampling optical pulse generation unit;
a photoelectric converter which receives light of the optical pulse signal supplied from the optical sampling unit of the optical signal synchronization sampling apparatus, and converts the optical pulse signal into an electric signal to output the electric signal;
fundamental wave component signal output means for supplying a fundamental wave component signal having a frequency identical to that of a fundamental wave component of an envelope curve of the electric signal supplied from the photoelectric converter;
a comparator which compares the fundamental wave component signal supplied from the fundamental wave component signal output means and a predetermined threshold; and
a data obtaining control unit which starts to obtain information on a waveform of the electric signal supplied from the photoelectric converter at a time the fundamental wave component signal exceeds the threshold in the comparison performed by the comparator,
wherein the optical sampling unit of the optical signal synchronization sampling apparatus includes:
an electroabsorption optical modulator which has two optical terminals and a power supply terminal, the two optical terminals being used to input and output light, the power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the monitoring object optical signal at one of the two optical terminals;
a direct-current power supply which applies a predetermined direct-current voltage to the power supply terminal of the electroabsorption optical modulator, the electroabsorption optical modulator exhibiting a high absorption index with respect to the monitoring object optical signal at the predetermined direct-current voltage; and
a photocoupler which receives the sampling optical pulse to input the sampling optical pulse into another of the two optical terminals of the electroabsorption optical modulator, the sampling optical pulse being emitted from the sampling optical pulse generation unit of the optical signal synchronization sampling apparatus, the photocoupler receiving the monitoring object optical signal to input the monitoring object optical signal as the optical pulse signal into the photoelectric converter, the monitoring object optical signal being emitted from the other of the two optical terminals of the electroabsorption optical modulator, and
wherein when the sampling optical pulse is supplied, the absorption index is lowered by a mutual absorption saturation characteristic of the electroabsorption optical modulator, and the monitoring object optical signal is passed onto a side of the other of the two optical terminals of the electroabsorption optical modulator to perform the synchronization sampling.

6. The optical signal monitoring apparatus according to claim 5, wherein, in order to prevent leakage of the sampling optical pulse to a transmission path of the monitoring object optical signal, the sampling optical pulse being input into the other of the two optical terminals of the electroabsorption optical modulator,
the optical sampling unit further includes:
a second photocoupler which is inserted into the one of the two optical terminals of the electroabsorption optical modulator; and
an optical terminator which terminates the sampling optical pulse through the second photocoupler.

7. The optical signal monitoring apparatus according to claim 5, wherein the sampling optical pulse generation unit includes:
a reference signal generator having a synthesizer configuration in which a stable signal is produced, the stable signal having a period Ts corresponding to a period of the sampling optical pulse;
a multiplier which supplies the stable signal as a signal multiplied by a factor of M (M is more than one), the stable signal being produced by the reference signal generator and having the period Ts;
a light source which emits continuous light;
an optical modulator which modulates the continuous light emitted from the light source by the signal multiplied by the factor of M, thereby supplying an optical pulse having a period Ts/M, the signal being supplied from the multiplier;
an optical gating circuit which thins out the optical pulse emitted from the optical modulator into 1/M, and converts the optical pulse into an optical pulse having the period Ts; and
a dispersion-decreasing fiber which narrows a pulse width of the optical pulse having the period Ts and converted by the optical gating circuit, and supplies the optical pulse as the sampling optical pulse.

8. The optical signal monitoring apparatus according to claim 5, further comprising a parameter setting unit which receives information on a clock period Tc of the data signal modulating the monitoring object optical signal or information on a bit rate of the data signal and information on the predetermined offset time $\Delta T$ to obtain a sampling period Ts of the sampling optical pulse from computation of $$Ts = N \cdot Tc + \Delta T$$

(where a value of N is determined by the clock period To of the data signal and a frequency variable range of a signal which can be supplied from the sampling optical pulse generation unit), the parameter setting unit setting the sampling period Ts of the sampling optical pulse in the sampling optical pulse generation unit.

9. The optical signal monitoring apparatus according to claim 5, further comprising an analog/digital converter which is inserted between the photoelectric converter and the data obtaining control unit, converts the electric signal from the photoelectric converter into a digital value by sampling the electric signal with a sampling clock synchronized with the sampling optical pulse, and supplies the digital value as a data signal to the data obtaining control unit.

10. The optical signal monitoring apparatus according to claim 9, wherein the sampling clock is supplied from the sampling optical pulse generation unit while synchronized with the sampling optical pulse.

11. The optical signal monitoring apparatus according to claim 9, further comprising a waveform memory having a plurality of different areas, the data obtaining control unit writing the data signal supplied from the A/D converter in the areas of the waveform memory based on the output signal supplied from the comparator.

12. The optical signal, monitoring apparatus according to claim 11, wherein the data obtaining control unit repeats an operation predetermined times, and writes a predetermined number of data signals in the plurality of different areas of the waveform memory in an address order, the data obtaining control unit starting to write the data signal in the waveform memory at a time the fundamental wave component signal exceeds the threshold value in the comparator and the data obtaining control unit standing by until, the fundamental wave component signal exceeds the threshold value again after the predetermined number of data signals are written in the operation.

13. The optical signal monitoring apparatus according to claim 12, further comprising a computation unit which computes a value indicating quality of the monitoring object optical signal based on the data signal written in the waveform memory.

14. The optical signal monitoring apparatus according to claim 13, wherein the computation unit compares the data signals written in the waveform memory with a predetermined threshold to classify the data signals into a sample value belonging to data "1" and a sample value belonging to data "0", obtains an average value and a standard deviation of a group of sample values for each of the data "1" and the data "0", and obtains a ratio $\mu/\gamma$ of a difference $\mu$ between the average values of the data "1" and the data "0" and a sum $\gamma$ of the standard deviations as a quality value.

15. The optical signal monitoring apparatus according to claim 13, wherein the computation unit superimposes pieces of predetermined-bit waveform data in the address order to obtain an eye pattern, the predetermined number of data signals being stored in the address order in each time for said plurality of different areas of the waveform memory in the predetermined-bit waveform data.

16. The optical signal monitoring apparatus according to claim 5, wherein,
in a filter system, the fundamental wave component signal output unit includes a narrowband bandpass filter which has a center frequency equal to a clock frequency of the data signal modulating the monitoring object optical signal or a center frequency double the clock frequency, and extracts a sinusoidal fundamental wave component signal from the electric signal supplied from the photoelectric converter.

17. The optical signal monitoring apparatus according to claim 5, wherein,
in a PLL (Phase-Locked Loop) system, the fundamental wave component signal output unit includes:
a narrowband bandpass filter which has a center frequency equal to a clock frequency Fc of the data signal modulating the monitoring object optical signal or a center frequency double the clock frequency, and extracts a sinusoidal fundamental wave component signal from the electric signal supplied from the photoelectric converter;
a voltage control oscillator which supplies an oscillation output signal having a predetermined oscillation frequency; and
a phase comparator which supplies a control signal according to a phase difference between an output signal of the bandpass filter and an output signal of the voltage control oscillator, and
the oscillation frequency of the voltage control oscillator is controlled by the control signal supplied from the phase comparator and a phase of the oscillation output signal is synchronized with a phase of the output signal of the bandpass filter, whereby the synchronized sinusoidal oscillation output signal is supplied as the fundamental wave component signal.

18. The optical signal monitoring apparatus according to claim 5, wherein the fundamental wave component signal output unit includes:
a frequency analysis computation unit which obtains a frequency of a fundamental wave component by analyzing a frequency of the electric signal supplied from the photoelectric converter; and
a signal generator which produces and supplies a fundamental wave component signal having a frequency identical to the fundamental wave component frequency obtained by the frequency analysis computation unit.

19. An optical signal synchronization sampling method comprising:
a sampling optical pulse generation step of emitting a sampling optical pulse having a period Ts different from integral a predetermined offset time $\Delta T$ to N multiplication of a clock period Tc of a data signal, the data signal modulating a sampling object optical signal; and
an optical synchronization sampling step of supplying an optical pulse signal obtained by performing synchronization sampling of the sampling object optical signal using the sampling optical pulse emitted by the sampling optical pulse generation step,
wherein the optical synchronization sampling step includes:
a step of preparing an electroabsorption optical modulator which has two optical terminals and a power supply terminal, the two optical terminals being used to input and output light, the power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the sampling object optical signal at one of the two optical terminals;
a step of preparing a direct-current power supply which applies a predetermined direct-current voltage to the power supply terminal of the electroabsorption optical modulator, the electroabsorption optical modulator exhibiting a high absorption index with respect to the sampling object optical signal at the predetermined direct-current voltage; and a step of preparing a photocoupler which receives the sampling optical pulse to input the sampling optical pulse into another of the two optical terminals of the electroabsorption optical modulator, the sampling optical pulse being emitted by the sampling optical pulse generation unit, the photocoupler receiving the sampling object optical signal to output the sampling object optical signal as the optical pulse signal, the sampling object optical signal being emitted by the other of the two optical terminals of the electroabsorption optical modulator, and wherein when the sampling optical pulse is input, the absorption index is lowered by a mutual absorption saturation characteristic of the electroabsorption optical modulator, and the sampling object optical signal is passed onto a side of the other of the two optical terminals of the electroabsorption optical modulator to perform the synchronization sampling.

20. An optical signal monitoring method comprising:

a sampling optical pulse generation step of emitting a sampling optical pulse having a period different from a predetermined offset time $\Delta T$ to integral N multiplication of a clock period Tc of a data signal, the data signal modulating a monitoring object optical signal;

an optical synchronization sampling step of supplying an optical pulse signal obtained by performing synchronization sampling of the monitoring object optical signal using the sampling optical pulse emitted by the sampling optical pulse generation step;

a photoelectric conversion step of receiving light of the optical pulse signal supplied from the optical synchronization sampling step, and converting the optical pulse signal into an electric signal to output the electric signal;

a fundamental wave component signal output step of supplying a fundamental wave component signal having a frequency identical to that of a fundamental wave component of an envelope curve of the electric signal supplied from the photoelectric conversion step;

a comparison step of comparing the fundamental wave component signal supplied from the fundamental wave component signal output step with a predetermined threshold value; and a data obtaining control step of starting to obtain information on a waveform of the electric signal supplied from the photoelectric conversion step at a time the fundamental wave component signal exceeds the threshold value in the comparison step, wherein the optical synchronization sampling step includes:

a step of preparing an electroabsorption optical modulator which has two optical terminals and a power supply terminal, the two optical terminals being used to input and output light, the power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the monitoring object optical signal at one of the two optical terminals;

a step of preparing a direct-current power supply which applies a predetermined direct-current voltage to the power supply terminal of the electroabsorption optical modulator, the electroabsorption optical modulator exhibiting a high absorption index with respect to the monitoring object optical signal at the predetermined direct-current voltage; and a step of preparing a photocoupler which receives the sampling optical pulse to input the sampling optical pulse into another of the two optical terminals of the electroabsorption optical modulator, the sampling optical pulse being emitted from the sampling optical pulse generation step, the photocoupler receiving the monitoring object optical signal to input the monitoring object optical signal as the optical pulse signal into the photoelectric conversion step, the monitoring object optical signal being emitted from the other of the two optical terminals of the electroabsorption optical modulator, and wherein when the sampling optical pulse is supplied, the absorption index is lowered by a mutual absorption saturation characteristic of the electroabsorption optical modulator, and the monitoring object optical signal is passed onto a side of the other of the two optical terminals of the electroabsorption optical modulator to perform the synchronization sampling.

21. The optical signal monitoring method according to claim 20, further comprising:

an analog/digital conversion step of converting the electric signal supplied from the photoelectric conversion step into a digital value by sampling the electric signal using a sampling clock synchronized with the sampling optical pulse, and supplying the digital value as a data signal; and a step of preparing a waveform memory having a plurality of different areas, the data obtaining control step writing the data signal in the areas of the waveform memory based on the output signal supplied from the comparison step, the data signal being supplied from the A/D conversion step.

22. The optical signal monitoring method according to claim 21, wherein, in the data obtaining control step, an operation is repeated predetermined times, and a predetermined number of data signals are written in the plurality of different areas of the waveform memory in an address order, writing of the data signal in the waveform memory being started at a time the fundamental wave component signal exceeds the threshold value in the comparison step and standby being performed until the fundamental wave component signal exceeds the threshold value again after the predetermined number of data signals are written in the operation.

23. The optical signal monitoring method according to claim 22, further comprising a computation step of computing a value indicating quality of the monitoring object optical signal based on the data signal written in the waveform memory.

24. The optical signal monitoring method according to claim 23, wherein, in the computation step, the data signals written in the waveform memory are compared with a predetermined threshold value to classify the data signals into a sample value belonging to data "1" and a sample value belonging to data "0", an average value and a standard deviation of a group of sample values are obtained for each of the data "1" and the data "0", and a ratio $\mu/\gamma$ of a difference $\mu$ between the average values of the data "1" and the data "0" and a sum $\gamma$ of the standard deviations is obtained as a quality value.

25. The optical signal monitoring method according to claim 23, wherein, in the computation step, pieces of predetermined-bit waveform data are superimposed in the address order to obtain an eye pattern, the predetermined number of data signals being stored in the address order in each time for said plurality of different areas of the waveform memory in the predetermined-bit waveform data.

* * * * *